(12) United States Patent
Chin

(10) Patent No.: US 11,461,077 B2
(45) Date of Patent: Oct. 4, 2022

(54) METHOD OF DISPLAYING DATA IN A TABLE WITH FIXED HEADER

(71) Applicant: Philip K. Chin, Metairie, LA (US)

(72) Inventor: Philip K. Chin, Metairie, LA (US)

(*) Notice: Subject to any disclaimer, the term of this patent is extended or adjusted under 35 U.S.C. 154(b) by 819 days.

(21) Appl. No.: 15/358,118

(22) Filed: Nov. 21, 2016

(65) Prior Publication Data

US 2017/0139874 A1    May 18, 2017

Related U.S. Application Data

(63) Continuation-in-part of application No. 14/012,998, filed on Aug. 28, 2013, now abandoned, which is a
(Continued)

(51) Int. Cl.
*G06F 8/38* (2018.01)
*G06F 40/103* (2020.01)
(Continued)

(52) U.S. Cl.
CPC .............. *G06F 8/38* (2013.01); *G06F 40/103* (2020.01); *G06F 40/143* (2020.01);
(Continued)

(58) Field of Classification Search
CPC ...... G06F 17/21; G06F 40/103; G06F 40/177; G06F 40/18; G06F 40/14; G06F 8/38; G06F 3/0485
(Continued)

(56) References Cited

U.S. PATENT DOCUMENTS 5,416,898 A * 5/1995 Opstad .................. G06F 17/214
345/468
6,044,383 A * 3/2000 Suzuki .................. G06F 17/245
715/236

(Continued)

OTHER PUBLICATIONS

Keith Shengili-Roberts, Core CSS: Cascading Style Sheets, Prentice Hill (Year: 2003).*

*Primary Examiner* — Andrew R Dyer
*Assistant Examiner* — Tionna M Burke
(74) *Attorney, Agent, or Firm* — Keaty Law Firm LLC

(57) ABSTRACT

A method and computer-executable program for displaying data in a table having columns, rows and a plurality of cells defined by the columns and rows. The method involves the steps of creating a first and a second sub-tables positioned one above another or side-by-side. The top sub-table defines a non-scrollable, fixed header, while the bottom table defines a scrollable data table. The top table has a visible part and a hidden part, which contains records copied, without re-positioning or re-ordering, from a maximum width cell in the top or bottom table corresponding to each individual column. To form a fixed sidebar, the code computer-executable program code adjusts the height of the rows based on the parameters of a maximum height cell in the row. The method and program provide for a two-step process of glyph determinations: Step 1 uses the glyph determinations to adjust the HTML, by copying data. Step 2 is a multi-task process which (a) takes the HTML data as is, with no more changes from user (b) makes glyph determinations for display, and then (c) actually displays the pixels. to render the fonts on a computer-controlled screen.

24 Claims, 30 Drawing Sheets

Related U.S. Application Data continuation-in-part of application No. 13/136,375, filed on Jul. 29, 2011, now abandoned, which is a continuation-in-part of application No. 11/983,904, filed on Nov. 13, 2007, now abandoned, which is a continuation-in-part of application No. 11/284,942, filed on Nov. 2, 2005, now abandoned.

(60) Provisional application No. 60/631,152, filed on Nov. 26, 2004.

(51) Int. Cl.
*G06F 40/18* (2020.01)
*G06F 40/177* (2020.01)
*G06F 40/143* (2020.01)
*G06F 3/0485* (2022.01)

(52) U.S. Cl.
CPC ............ *G06F 40/177* (2020.01); *G06F 40/18* (2020.01); *G06F 3/0485* (2013.01)

(58) Field of Classification Search
USPC .......................................................... 715/209
See application file for complete search history.

(56) References Cited

U.S. PATENT DOCUMENTS

| | | | | |
|---|---|---|---|---|
| 6,313,848 B1 * | 11/2001 | Hoag | .................... | G06F 17/217 345/684 |
| 6,691,281 B1 * | 2/2004 | Sorge | .................. | G06F 17/2205 715/234 |
| 2005/0120293 A1 * | 6/2005 | Benhase | ............... | G06F 17/245 715/217 |

* cited by examiner

| Order # ID | Customer ID | Ship Name | Order Date | ShipCountry |
|---|---|---|---|---|
| | | Vins et alcools Chevalier | 7/11/1996 12:00:00 AM | |
| Order # ID | Customer ID ▲Abc | Ship Name | Order Date | ShipCountry |
| 10254 | TORTU | Tortuga Restaurante | 7/11/1996 12:00:00 AM | Switzerland |
| 10253 | HANAR | Hanari Carnes | 7/10/1996 12:00:00 AM | Brazil |
| 10250 | HANAR | Hanari Carnes | 7/8/1996 12:00:00 AM | Brazil |
| 10255 | RICSU | Richter Supermarkt | 7/12/1996 12:00:00 AM | Switzerland |
| 10252 | SUPRD | Suprêmes délices | 7/9/1996 12:00:00 AM | Belgium |
| 10249 | TOMSP | Toms Spezialitäten | 7/5/1996 12:00:00 AM | Germany |
| 10251 | VICTE | Victuailles en stock | 7/8/1996 12:00:00 AM | France |
| 10248 | VINET | Vins et alcools Chevalier | 7/4/1996 12:00:00 AM | France |
| 10256 | WELLI | Wellington Importadora | 7/15/1996 12:00:00 AM | Brazil |
| Order # ID | Customer ID | Vins et alcools Chevalier | 7/11/1996 12:00:00 AM | ShipCountry |

*Figure 4*

| Order # ID | | Vins et alcools Chevalier | 7/11/1996 12:00:00 AM | Switzerland |
|---|---|---|---|---|
| | Customer ID | | | ShipCountry |
| Order # ID | Customer ID Abc | Ship Name | Order Date | ShipCountry |
| 10254 | TORTU | Tortuga Restaurante | 7/11/1996 12:00:00 AM | Switzerland |
| 10253 | HANAR | Hanari Carnes | 7/10/1996 12:00:00 AM | Brazil |
| 10250 | HANAR | Hanari Carnes | 7/8/1996 12:00:00 AM | Brazil |
| 10255 | RICSU | Richter Supermarkt | 7/12/1996 12:00:00 AM | Switzerland |
| 10252 | SUPRD | Suprêmes délices | 7/9/1996 12:00:00 AM | Belgium |
| 10249 | TOMSP | Toms Spezialitäten | 7/5/1996 12:00:00 AM | Germany |
| 10251 | VICTE | Victuailles en stock | 7/8/1996 12:00:00 AM | France |
| 10248 | VINET | Vins et alcools Chevalier | 7/4/1996 12:00:00 AM | France |
| 10256 | WELLI | Wellington Importadora | 7/5/1996 12:00:00 AM | Brazil |
| Order # ID | Customer ID | Vins et alcools Chevalier | 7/11/1996 12:00:00 AM | ShipCountry |

*Figure 5*

| Order # ID | Customer ID | | 7/11/1996 12:00:00 AM | ShipCountry |
|---|---|---|---|---|
| | Vins et alcools Chevalier | | | |

| Order # ID | Customer ID | Ship Name | Order Date | ShipCountry |
|---|---|---|---|---|
| 10254 | TORTU | Tortuga Restaurante | 7/11/1996 12:00:00 AM | Switzerland |
| 10253 | HANAR | Hanari Carnes | 7/10/1996 12:00:00 AM | Brazil |
| 10250 | HANAR | Hanari Carnes | 7/8/1996 12:00:00 AM | Brazil |
| 10255 | RICSU | Richter Supermarkt | 7/12/1996 12:00:00 AM | Switzerland |
| 10252 | SUPRD | Suprêmes délices | 7/9/1996 12:00:00 AM | Belgium |
| 10249 | TOMSP | Toms Spezialitäten | 7/5/1996 12:00:00 AM | Germany |
| 10251 | VICTE | Victuailles en stock | 7/8/1996 12:00:00 AM | France |
| 10248 | VINET | Vins et alcools Chevalier | 7/4/1996 12:00:00 AM | France |
| 10256 | WELLI | Wellington Importadora | 7/15/1996 12:00:00 AM | Brazil |
| Order # ID | Customer ID | Vins et alcools Chevalier | 7/11/1996 12:00:00 AM | ShipCountry |

*Figure 6*

```
/* HIDDEN STYLES */
.FH_TR_Hidden {
  visibility: hidden;
  line-height: 1px;
  position: relative;
  top: -5px;
}

.FH_LeftTDHidden {
  text-align: left;
  background-color: #FFFFFF;
  font-size: 12px;
  font-family: Arial, Helvetica, sans-serif;
  /*visibility: hidden; line-height: 1px;*/
  padding: 0px 3px 0px 3px;
  border-bottom: none;
  border-left: 1px solid White;
  border-right: 1px solid Black;
  border-top: 1px solid Black;
  /*vertical-align: bottom;*/
  /*height: 0px;*/
}

.FH_RightTDHidden {
  text-align: left;
  background-color: #FFFFFF;
  font-size: 12px;
  font-family: Arial, Helvetica, sans-serif;
  /*visibility: hidden; line-height: 1px;*/
  padding: 0px 3px 0px 3px;
  border-bottom: none;
  border-left: 0px solid White;
  border-right: 1px solid Black;
  border-top: 1px solid Black;
  /*vertical-align: bottom;*/
  /*height: 0px;*/
}
``` visibility: hidden; and line-height: 1px;

98

| Order # ID | Customer ID | Ship Name | Order Date | ShipCountry |
|---|---|---|---|---|
| 10248 | VINET | Vins et alcools Chevalier | 7/4/1996 12:00:00 AM | France |
| 10249 | TOMSP | Toms Spezialitäten | 7/5/1996 12:00:00 AM | Germany |
| 10250 | HANAR | Hanari Carnes | 7/8/1996 12:00:00 AM | Brazil |
| 10251 | VICTE | Victuailles en stock | 7/8/1996 12:00:00 AM | France |
| 10252 | SUPRD | Suprêmes délices | 7/9/1996 12:00:00 AM | Belgium |
| 10253 | HANAR | Hanari Carnes | 7/10/1996 12:00:00 AM | Brazil |
| 10254 | TORTU | Tortuga Restaurante | 7/11/1996 12:00:00 AM | Switzerland |
| 10255 | RICSU | Richter Supermarkt | 7/12/1996 12:00:00 AM | Switzerland |
| 10256 | WELLI | Wellington Importadora | 7/15/1996 12:00:00 AM | Brazil |

*Figure 8*

Collapsed State

Expanded State

| ID | First Name | Last Name | Hire Date |
|---|---|---|---|
| A-C71970F | Aria | Cruz | 10/26/1991 12:00:00 AM |
| A-R89858F | Annette | Roulet | 2/21/1990 12:00:00 AM |
| AMD15433F | Ann | Devon | 7/16/1991 12:00:00 AM |
| ARD36773F | Anabela | Domingues | 1/27/1993 12:00:00 AM |
| CFH28514M | Carlos | Hernadez | 4/21/1989 12:00:00 AM |
| CGS88322F | Carine | Schmitt | 7/7/1992 12:00:00 AM |
| DBT39435M | Daniel | Tonini | 1/1/1990 12:00:00 AM |
| DWR65030M | Diego | Roel | 12/16/1991 12:00:00 AM |
| ENL44273F | Elizabeth | Lincoln | 7/24/1990 12:00:00 AM |

*Figure 9*

| Header | ColumnA | ColumnB | ColumnC | ColumnD |
|---|---|---|---|---|
| 1 | Los Angeles, CA | 1234 Park Avenue West | 94001 | Mary Jane Smith |
| 2 | San Francisco, CA | 100 Main Street | 95632 | John Doe |

*Figure 10*

| Header | ColumnA | ColumnB | ColumnC | ColumnD |
|--------|---------|---------|---------|---------|
| 1 | Los Angeles, CA | 1234 Park Avenue West | 94001 | Mary Jane Smith |
| 2 | San Francisco, CA | 100 Main Street | 95632 | John Doe |

*Figure 11*

Character Widths for Font Name:
  Geneva, em-size 12 , Regular Text (as opposed to Bold), Units in Pixels

[32] = (4 pixels)
[33] = ! (8.113281 pixels)
[34] = " (9.859375 pixels)
[35] = # (10.87305 pixels)
[36] = $ (10.87305 pixels)
[37] = % (14.99219 pixels)
[38] = & (12.92383 pixels)
[39] = ' (6.941406 pixels)
[40] = ( (8.113281 pixels)
[41] = ) (8.113281 pixels)
[42] = * (8.810547 pixels)
[43] = + (11.21875 pixels)
[44] = , (7.433594 pixels)
[45] = - (8.113281 pixels)
[46] = . (7.433594 pixels)
[47] = / (7.433594 pixels)
[48] = 0 (10.87305 pixels)
[49] = 1 (10.87305 pixels)
[50] = 2 (10.87305 pixels)
[51] = 3 (10.87305 pixels)
[52] = 4 (10.87305 pixels)
[53] = 5 (10.87305 pixels)
[54] = 6 (10.87305 pixels)
[55] = 7 (10.87305 pixels)
[56] = 8 (10.87305 pixels)
[57] = 9 (10.87305 pixels)
[58] = : (8.113281 pixels)
[59] = ; (8.113281 pixels)
[60] = < (11.21875 pixels)
[61] = = (11.21875 pixels)
[62] = > (11.21875 pixels)
[63] = ? (11.55273 pixels)
[64] = @ (16.05273 pixels)

[65] = A (12.92383 pixels)
[66] = B (12.92383 pixels)
[67] = C (12.92383 pixels)
[68] = D (12.92383 pixels)
[69] = E (12.24414 pixels)
[70] = F (11.55273 pixels)
[71] = G (13.61523 pixels)
[72] = H (12.92383 pixels)
[73] = I (7.433594 pixels)
[74] = J (10.87305 pixels)
[75] = K (12.92383 pixels)
[76] = L (11.55273 pixels)
[77] = M (14.29492 pixels)
[78] = N (12.92383 pixels)
[79] = O (13.61523 pixels)
[80] = P (12.24414 pixels)
[81] = Q (13.61523 pixels)
[82] = R (12.92383 pixels)
[83] = S (12.24414 pixels)
[84] = T (11.55273 pixels)
[85] = U (12.92383 pixels)
[86] = V (12.24414 pixels)
[87] = W (15.66602 pixels)
[88] = X (12.24414 pixels)
[89] = Y (12.24414 pixels)
[90] = Z (11.55273 pixels)
[91] = [ (8.113281 pixels)
[92] = \ (7.433594 pixels)
[93] = ] (8.113281 pixels)
[94] = ^ (11.21875 pixels)
[95] = _ (10.87305 pixels)
[96] = ` (8.113281 pixels)

[97] = a (10.87305 pixels)
[98] = b (11.55273 pixels)
[99] = c (10.87305 pixels)
[100] = d (11.55273 pixels)
[101] = e (10.87305 pixels)
[102] = f (8.113281 pixels)
[103] = g (11.55273 pixels)
[104] = h (11.55273 pixels)
[105] = i (7.433594 pixels)
[106] = j (7.433594 pixels)
[107] = k (10.87305 pixels)
[108] = l (7.433594 pixels)
[109] = m (14.99219 pixels)
[110] = n (11.55273 pixels)
[111] = o (11.55273 pixels)
[112] = p (11.55273 pixels)
[113] = q (11.55273 pixels)
[114] = r (8.810547 pixels)
[115] = s (10.87305 pixels)
[116] = t (8.113281 pixels)
[117] = u (11.55273 pixels)
[118] = v (10.87305 pixels)
[119] = w (13.61523 pixels)
[120] = x (10.87305 pixels)
[121] = y (10.87305 pixels)
[122] = z (10.18164 pixels)
[123] = { (8.810547 pixels)
[124] = | (7.457031 pixels)
[125] = } (8.810547 pixels)
[126] = ~ (11.21875 pixels)

[ASCII code] = 'the actual character' (size)

*Figure 12*

Character Widths for Font Name:
Times, em-size 14 , Bold Text (as opposed to regular), Units in Pixels

[32] = (4 pixels)
[33] = ! (8.113281 pixels)
[34] = " (9.859375 pixels)
[35] = # (10.87305 pixels)
[36] = $ (10.87305 pixels)
[37] = % (14.99219 pixels)
[38] = & (12.92383 pixels)
[39] = ' (6.941406 pixels)
[40] = ( (8.113281 pixels)
[41] = ) (8.113281 pixels)
[42] = * (8.810547 pixels)
[43] = + (11.21875 pixels)
[44] = , (7.433594 pixels)
[45] = - (8.113281 pixels)
[46] = . (7.433594 pixels)
[47] = / (7.433594 pixels)
[48] = 0 (10.87305 pixels)
[49] = 1 (10.87305 pixels)
[50] = 2 (10.87305 pixels)
[51] = 3 (10.87305 pixels)
[52] = 4 (10.87305 pixels)
[53] = 5 (10.87305 pixels)
[54] = 6 (10.87305 pixels)
[55] = 7 (10.87305 pixels)
[56] = 8 (10.87305 pixels)
[57] = 9 (10.87305 pixels)
[58] = : (8.113281 pixels)
[59] = ; (8.113281 pixels)
[60] = < (11.21875 pixels)
[61] = = (11.21875 pixels)
[62] = > (11.21875 pixels)
[63] = ? (11.55273 pixels)
[64] = @ (16.05273 pixels)

[65] = A (12.92383 pixels)
[66] = B (12.92383 pixels)
[67] = C (12.92383 pixels)
[68] = D (12.92383 pixels)
[69] = E (12.24414 pixels)
[70] = F (11.55273 pixels)
[71] = G (13.61523 pixels)
[72] = H (12.92383 pixels)
[73] = I (7.433594 pixels)
[74] = J (10.87305 pixels)
[75] = K (12.92383 pixels)
[76] = L (11.55273 pixels)
[77] = M (14.29492 pixels)
[78] = N (12.92383 pixels)
[79] = O (13.61523 pixels)
[80] = P (12.24414 pixels)
[81] = Q (13.61523 pixels)
[82] = R (12.92383 pixels)
[83] = S (12.24414 pixels)
[84] = T (11.55273 pixels)
[85] = U (12.92383 pixels)
[86] = V (12.24414 pixels)
[87] = W (15.66602 pixels)
[88] = X (12.24414 pixels)
[89] = Y (12.24414 pixels)
[90] = Z (11.55273 pixels)
[91] = [ (8.113281 pixels)
[92] = \ (7.433594 pixels)
[93] = ] (8.113281 pixels)
[94] = ^ (11.21875 pixels)
[95] = _ (10.87305 pixels)
[96] = ` (8.113281 pixels)

[97] = a (10.87305 pixels)
[98] = b (11.55273 pixels)
[99] = c (10.87305 pixels)
[100] = d (11.55273 pixels)
[101] = e (10.87305 pixels)
[102] = f (8.113281 pixels)
[103] = g (11.55273 pixels)
[104] = h (11.55273 pixels)
[105] = i (7.433594 pixels)
[106] = j (7.433594 pixels)
[107] = k (10.87305 pixels)
[108] = l (7.433594 pixels)
[109] = m (14.99219 pixels)
[110] = n (11.55273 pixels)
[111] = o (11.55273 pixels)
[112] = p (11.55273 pixels)
[113] = q (11.55273 pixels)
[114] = r (8.810547 pixels)
[115] = s (10.87305 pixels)
[116] = t (8.113281 pixels)
[117] = u (11.55273 pixels)
[118] = v (10.87305 pixels)
[119] = w (13.61523 pixels)
[120] = x (10.87305 pixels)
[121] = y (10.87305 pixels)
[122] = z (10.18164 pixels)
[123] = { (8.810547 pixels)
[124] = | (7.457031 pixels)
[125] = } (8.810547 pixels)
[126] = ~ (11.21875 pixels)

[ASCII code] = 'the actual character' (size)

*Figure 13*

```
Text Measured:      New Orleans Saints
Font: Geneva
Size: 10 pixels
Text: Regular N    Size = 10.76986 pixels
       e    Size = 9.060872 pixels
       w    Size = 10.76986 pixels
            Size = 3.333333 pixels
       O    Size = 11.34603 pixels
       r    Size = 6.761067 pixels
       l    Size = 5.681966 pixels
       e    Size = 9.060872 pixels
       a    Size = 9.060872 pixels
       n    Size = 9.060872 pixels
       s    Size = 8.4847 pixels
            Size = 3.333333 pixels
       S    Size = 10.20345 pixels
       a    Size = 9.060872 pixels
       i    Size = 5.681966 pixels
       n    Size = 9.060872 pixels
       t    Size = 6.194661 pixels
       s    Size = 8.4847 pixels
       --------------------------------
       Total Size = 94.21223 pixels
```

*Figure 14*

| Order # ID | Customer ID | Ship Name | Order Date | ShipCountry |
|---|---|---|---|---|
| 10248 | VINET | Vins et alcools Chevalier | 7/4/1996 12:00:00 AM | France |
| 10249 | TOMSP | Toms Spezialitäten | 7/5/1996 12:00:00 AM | Germany |
| 10250 | HANAR | Hanari Carnes | 7/8/1996 12:00:00 AM | Brazil |
| 10251 | VICTE | Victuailles en stock | 7/8/1996 12:00:00 AM | France |
| 10252 | SUPRD | Magazzini Alimentari Riuniti | | |
| | | Suprêmes délices | 7/9/1996 12:00:00 AM | Belgium |
| 10253 | HANAR | Hanari Carnes | 7/10/1996 12:00:00 AM | Brazil |
| 10254 | TORTU | Tortuga Restaurante | 7/11/1996 12:00:00 AM | Switzerland |
| 10255 | RICSU | Richter Supermarkt | 7/12/1996 12:00:00 AM | Switzerland |

*Figure 19*

METHOD OF DISPLAYING DATA IN A TABLE WITH FIXED HEADER

CROSS-REFERENCE TO RELATED APPLICATIONS

This application is a continuation-in-part of my co-pending application Ser. No. 14/012,998 filed on Aug. 28, 2013, which is a continuation-in-part of application Ser. No. 13/136,375, filed on Jul. 29, 2011 (abandoned), which is a continuation-in-part of application Ser. No. 11/983,904 filed on Dec. 13, 2007 entitled "Method of Displaying Data in a Table" (abandoned), which is a continuation-in-part of application Ser. No. 11/284,942 filed on Nov. 21, 2005 (abandoned), which is based on my provisional application No. 60/631,152 filed on Nov. 26, 2004, entitled "Method For Creating a Data Table with a Stationary Header in a Web Page," the priority of which is hereby claimed and the full disclosures of which are incorporated by reference herein.

BACKGROUND OF THE INVENTION

One of the preferred methods of displaying data in a text document and on a web page is a table. When a table is placed in a text document, the entire table has fixed parameters delimited by the size of the page. However, forming a table on a web page is much more difficult. When a web page designer needs to display multiple rows of data, e.g. 20, 50, 100, or more rows, it is highly desirable to design a table such that the headers or labels of each column of data remain "fixed" or "stationary." In this manner, a user, or person using a browser, can scroll down the rows of data and still see the column headers or column labels at the top of the table. The browser can be any of the well known programs, such as for instance Microsoft Internet Explorer, Mozilla, Apple Safari, Opera, Firefox and the like.

Some programs allow the header rows to remain stationary on top of a page, while the user scrolls vertically along the columns of in a table. One such example is Microsoft Excel, a Windows-based program extensively used in accounting. However, Microsoft Excel is not a traditional Web Page that uses HTML (Hyper Text Markup Language), or CSS (Cascading Style Sheets), that is an application suitable for displaying data on an Internet-web page. Although Microsoft Excel spreadsheet can still be viewed in a browser, it is still not a typical web page that uses HTML or CSS; it has many limitations in its use and where it can be used.

Several attempts have been made to create a web page that has a stationary header. Some have used two HTML tables with the top table containing one row and setting the "width" of each column and/or its table attributes to a certain pixel or percentage amount so that each column width matches the column width amount of the bottom table that contains the data. The disadvantage of this method is that one has difficulty in determining the correct width amount to set each column. By setting the width to a static value, whether in pixels or percentages, the top table and its columns cannot "flow" or contract or expand width-wise as easily as if there were no width settings in the first place. Furthermore, if the data comes from a database, the data can constantly change as well, thus the top table's columns width amounts can either be too large or too small for the data and headers to be displayed.

Other methods to display a stationary header row for a table are those that use HTML FRAMES and IFRAMEs. There are numerous web sites that list the disadvantages of FRAMES in the use of web pages. Some disadvantages are the difficulty in book marking and printing. Others are the requirements for a "clean" layout and the additional scrollbars. Still another disadvantage is the difficulty of the design and maintenance of the FRAMED or IFRAME web pages.

Complicating matters further, it is highly desirable for any of the methods of displaying a stationary header to work across multiple browsers. This cross-browser compatibility is also very difficult to achieve even without the use of stationary headers. And complicating matter still more, each browser has a text size setting that an individual can set and can override the text size settings in the browser depending on which browser is being used. Thus, even if a web programmer or web developer or web designer sets the font setting for the data, the individual users, depending on which browser they are using, can override this setting so as to make it easier to see the web page at the desired font size.

There are numerous factors to consider when designing a fixed header table in a web page. Some of these factors are listed below:

1. Fixed Header tables are used to display data that is typically stored in a database of some sort. This data can constantly change. Thus, setting the <td> width attribute is very difficult.

2. The Text as well as the Font Size and Weight (e.g. bold) of the Header information row can also change. This also affects the alignment of the columns.

3. Images can also be placed inside the data cell. This also must be accounted for, or alignment will suffer.

4. Images can be placed in the header (e.g. direction of sorting). Again, if this is not accounted for, the columns will be misaligned.

5. Browser versions and browser types can display data differently. Slight differences can cause columns to be misaligned.

6. The user's browser window size settings affect the displaying of data. A user who sets his window to be smaller or larger can affect the display of data. If the browser is maximized, this also can affect the alignment.

7. Other browser settings, such as the Text Size Setting also affect the alignment of columns. The text size setting is set by the individual and can easily affect the alignment of the columns. Each browser's implementation of the HTML font unit type declaration is also different. That is, certain font unit sizes can be adjusted by some browsers while other browsers cannot adjust the text. For example, IE Text Size adjustment cannot adjust a font size that uses the pixel (px) unit size. The Mozilla and Opera browsers allow their users to adjust the pixel font unit type.

There are programs such as a plug-in FLASH that can implement a fixed header table. But this is not standard HTML and for that matter one needs another authoring tool to work with FLASH to begin with. FLASH is reported to be slow in this respect. Moreover, downloading anything onto a computer from the Internet is just risky due to viruses and spyware. Programs like ActiveX, Java Applets are typically used by hackers to infect user's computer, and since this is so, user will set their security setting to deny such programs and will buy commercial protection software to help prevent programs like the above from ever being installed on their computer.

It is known that Microsoft Excel can be viewed in the browser. However, this is not desirable as only an Excel page can be viewed. Further, hackers have been known to exploit Excel files so that it can carry viruses and spyware. Additionally, there is also Java language that can do this as well, but again, this is not simple HTML, CSS, and JavaScript which are accepted as safe languages and are already on a user's computer to begin with.

Some software on web pages directs the user to "double click" between the headers of columns to automatically resize the columns to fit. This additional step may not be beneficial under some circumstances as it complicates a relatively simple task. Web pages that allow this step rely heavily on JavaScript and practically no HTML. Such pages appear to be "heavy," taking time to load in a user's browser.

These and other factors should be considered when making a fixed header table (or datagrid). Any of these factors, no matter how miniscule can cause misalignment. And thus, a fixed header that can be used on a production quality level has so far been unobtainable. A production quality fixed header table should be usable by a majority of the popular browsers (e.g. 99%) and should be able to adjust to the many user settings as well as the data that is displayed.

One other attempt to solve the problem of stationary headers is discussed in published U.S. application of Benhase et al., Publication No. 2005/0120293. Benhase et al. use Sub Heading Cells to determine the width of the Main Heading Cell. The "Sub leading Cell" is really a row of data, actually a single row of sub heading data, not the entire data table area that contains more than one row of data. The published application teaches that the columns are hidden, that is, entire columns, including the sub heading column, which means that the user of the method of Benhase et al will not be able to hide a single cell inside a vertical column in order to form a stationary header. In fact, Benhase et al do not teach a method, whereby each column has a stationary header row, which is one of the objects of this invention. Benhase et al use multiple dummy tables and display them separately in different locations, one of the dummy tables including one or more of the associated headers. The method of Benhase application does not provide for using the sum of the character width and/or image widths in a record cell to be used for creating a maximum width-or-height cell. Benhase method does not provide for copying of data. Instead, Benhase et al use reordering of columns, that is moving the columns from one place to another. If multiple columns are affected, the code also moves the headings in header level 2 that are affected. A column can also be hidden by specifying that it should not be displayed. The same algorithm applies to the rows when doing sorting and filtering. In fact, Benhase et al's method is not concerned with forming a table that has a scrollable part, a non-scrollable header, together with a visible part and a hidden part.

More complex data reordering methods are discussed in "Analysis of Data Reordering Techniques," by Tan Apaydin et al. published by SSDBM '08 Proceedings of the 20.sup.th International Conference on Scientific and Statistical Database Management, available at portal.acm_sub.org/citation-.cfm?id=1425187 (last visited Dec. 23, 2010). The document demonstrates that there are no "copying" steps in the reordering techniques.

The present invention contemplates elimination of drawbacks associated with the prior methods and provision of a method of displaying data in a table with the first horizontal row (header) remaining stationary while allowing the user to vertically scroll the columns. Similarly, the fixed "Header" can be positioned on the right or left of a multi-cell Data table. Anyone on the Internet with almost any browser should be able to access a fixed header table designed according to the method of the present invention.

SUMMARY OF THE INVENTION

It is, therefore, an object of the present invention to provide a method of displaying data in a tabular form.

It is another object of the present invention to provide a method of displaying tabular data on a web page, with the first horizontal row of data (header row) remaining stationary.

These and other objects of the invention are achieved through a provision of a method of displaying tabulated data, while retaining the header in a "stationary position." At the same time, the data table can be vertically scrolled and still remain in alignment with the header. The Header row of the top table can contain multiple column headings corresponding to each data column below in the respective bottom Data table.

In this method, the Header table contains at least two rows, and the bottom Data table contains at least two rows. One row of the top Header table contains and displays the header text that is viewable. The second "Hidden" row-contains placeholder text or HTML to automatically set the width of each corresponding header column. The placeholder text or html of each "hidden" row's Header column is determined by determining the maximum widths of each data cell and its corresponding text or HTML in the bottom data table. The text or HTML within the cell that contains the maximum width for its corresponding column is then used as the placeholder in the hidden Header rows cell. The hidden row and cell uses CSS to assist in making the cell not visible to the user.

The method of displaying on a computer-controlled screen, records arranged in a table according to this invention provides for the steps of forming a first non-scrollable sub-table within said table for displaying headings of the columns; forming a second scrollable sub-table within said table for displaying records corresponding to the headings in the first sub-table; defining maximum width and/or height parameters for each column in the first sub-table and the second sub-table based on a total value of characters and/or images in a maximum width or height cell within said each column based on character spacing and alignment, thereby creating a maximum height-or-width parameter cell; defining a visible part of the first sub-table to be visible on the computer-controlled screen and a hidden part of the first sub-table that is non-visible on the computer-controlled screen; copying, without re-positioning, character and/or image data of the maximum height-or-width parameter cell into a hidden cell within the same column in the hidden part of the first sub-table, thereby hiding a copy of the maximum height-or-width parameter cell in a header for the said same column, while defining the width or height parameters of the said same column and while the maximum height-or-width parameter cell remains visible in the first sub-table; and displaying on the computer-controlled screen, records arranged in a table having a non-scrollable header part and a scrollable part in each data cell.

The method of this invention provides for a two-step process of glyph determinations:

Step 1 uses the glyph determinations to adjust the HTML by copying data. Step 2 is a multi-task process which (a) takes the HTML data as is, with no more changes from user (e.g. there is no copying of data into hidden cells, which is performed in Step 1; (b) makes glyph determinations for display, and then (c) actually displays the pixels (turns them on/off and/or chooses the pixel color) to render the fonts on the monitor.

The invention also discloses a computer program code embodied in a computer-readable medium, the code comprising a computer-executable program code for defining a set total value of height-or-width characters and/or images based on character spacing and alignment for a record of the database arranged in a record table having columns, rows and a plurality of cells defined by the columns and rows; a computer-executable program code for determining maximum height-or-width character and/or image parameters for each column or row in the record table based on records to be displayed in a cell that will have the maximum height-or-width parameters; a computer-executable program code for establishing a first sub-table defining a non-scrollable part of each column; a computer-executable program code for establishing a second sub-table defining scrollable part of each column; a computer-executable program code for establishing a visible part of the first sub-table and a hidden part of the first sub-table; and a computer-executable program code for copying, without re-positioning, records from a visible cell having maximum height-or-width character and/or image record into a hidden cell within the same column in the hidden part of the first sub-table, to thereby define height-or-width parameters of the said same columns or rows in the first sub-table and the second sub-table, said computer program code thereby hiding a copy of the maximum height-or-width parameter record data in the hidden cell, while allowing the maximum height-or-width parameter record data to remain visible in the visible cell, while defining a set of parameters for displaying records arranged in a table having a stationary part and a scrollable part in each column.

If there are images that need to be in the hidden row, the heights of these image are set to smaller value, e.g. height="0" or height="1" or height="2", etc. This causes the hidden row to reduce in height while still having the original width. Additionally, another CSS method is set the visibility property for the Hidden row or the Hidden cell to the value of the "hidden." The scrollable portion of the data table is created by the use of DIV tags and setting this DIV tag's CSS attributes to values that cause a scrollbar to appear. The CSS attributes are typically height, overflow, overflow-x and overflow-y, etc. Such information can be set via a program or directly in a web page.

Each top Header column text or HTML width is then compared to the bottom Data table width for each column. If a top Header table's cell text or HTML is wider than any of the bottom Data table's corresponding cell, another hidden row is added to the bottom Data table. This "hidden" row for the bottom Data table will contain any corresponding HTML or text in the Header table so that the columns of the bottom Data table will resize themselves to have the same widths of the top Header table columns. The two tables, top Header and bottom Data, swap data or headers labels and place them in their "Hidden" respective columns and rows. These hidden rows use CSS properties and values like or "visibility: hidden" or "display: none" to assist in hiding the "swapped" copies data or header labels. Furthermore, the "swapped" copies of data or header labels do not have to be exact copies of the data or header labels and can be any HTML or text that will cause the width of the corresponding column to match to opposite table, e.g. the top Header table or the bottom Data table.

The instant method also determines the width of the text and/or html in each cell of the bottom Data table. In particular, the text can use different types of proportional fonts, e.g. Arial, Times, etc. that are not of stationary widths, such as Courier. The method determines the total width of all the characters in the text for a cell of data and uses this total width to determine which cell's HTML or text should be copied and placed in the opposite table's corresponding cell.

One important part of the method is the use of an additional "placeholder" row of data obscured by cascading style sheet properties; the second part is the determined use of the widest cell in a column to place derived or replicated contents in an adjoining table so that the columns of the data and the stationary header align properly.

In another embodiment, each column width of the table, (<TD> in HTML), in pixels or percentages can be set dynamically according the determination of the data widths and the Headers widths and choosing the maximum widths from the Headers cells and the Data cells. If percentages are desired, each column's maximum cell width could be summed together and then percentages can be determined for each Header and Data columns. Additionally, the maximum character width of the table can also be later modified to shorten overly long data via an ellipse " . . . " or some other indicator to lessen the maximum width of a column or columns.

When this stationary Header table system of the instant invention is used in conjunction with another table for a third (3rd) table and with certain CSS and DIV tags and smart processing, a multi-column drop down list can also be made. Most, if not almost all, drop down lists on the Internet are single column drop down lists. There are a few that have multi-columns drop down lists, however there are limitations to these types of implementations. And, as such, there are essentially no mainstream or popular Web sites that use such multi-column drop down lists.

The instant method also allows displaying a multi-column drop down list in a web page. It aligns the columns of a top row of data with the columns of the bottom rows of data while additionally collapsing or expanding the bottom rows of data depending upon the user input. The method allows users to see in a Web page, the fixed Header rows that users now see in spreadsheet programs such as Excel when they scroll vertically through rows of data. By having a fixed header rows' columns aligned to the below rows' columns, users can easily see the columns names that are located in the fixed Header row.

Another aspect of the present invention allows a user to accomplish resizing of the cells at the server and/or client and will not require all unnecessary double click by the user to auto resize the columns or any other extra user intervention to get rights sized column widths.

BRIEF DESCRIPTION OF THE DRAWINGS

Reference will now be made to the drawings, wherein like parts are designated by like numerals, and wherein.

FIG. 4 is an illustration of a fixed header table with viewable hidden rows.

FIG. 5 is an illustration of a table with a hidden header; the existing header cell is the widest display of the columns.

FIG. 6 is an illustration of a table with a data cell being the widest display in the column.

FIG. 8 is an illustration of a table displayed in Code Snippet of CSS style sheet used to hide hidden rows.

FIG. 9 is a schematic view of a multi-column drop down box with a fixed header table in a collapsed and expanded state.

FIG. 10 is an illustration of HTML table with different columns in the cell rows being the widest.

FIG. 11 is an illustration of two tables, wherein in the top table the data is removed and the in bottom table—the header is removed.

FIG. 12 is an illustration table demonstrating an example of character widths for "Geneva" font suitable for use in the method of the present invention.

FIG. 13 is an illustration table demonstrating all example of character widths for "Times" font suitable for use in the method of the present invention.

FIG. 14 is a sample width determination sheet of display width for the phrase "New Orleans Saints."

FIG. 19 illustrates a view on a computer monitor screen with two fixed header tables, with one of the tables acting as a fixed sidebar table.

FIG. 22A illustrates a bounding box or bounding rectangle and FIG. 22B illustrates the measurement line to determine the left and right side bearings.

DETAIL DESCRIPTION OF THE, INVENTION

Figure 1:
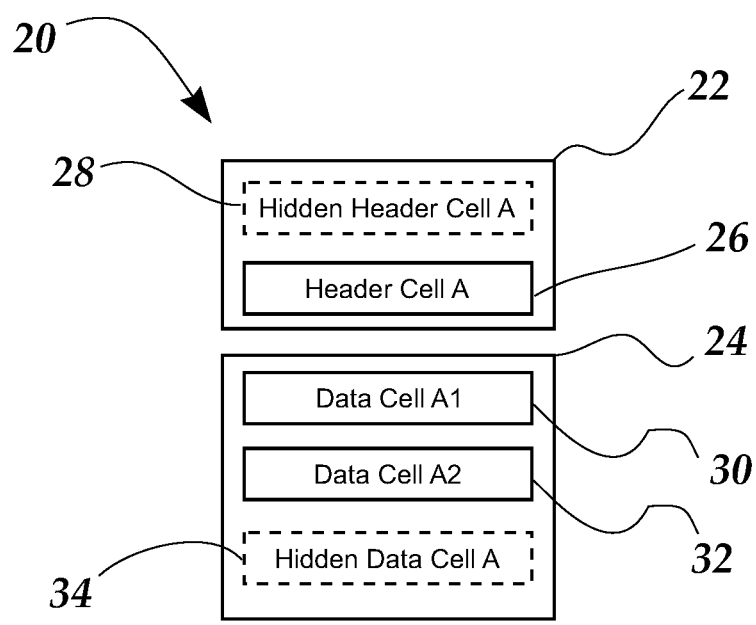
FIG. 1 is a schematic view of a one-column data display containing a header and one or more data cells.

Turning now to the drawings in more detail. FIG. 10 illustrates an HTML table having a header 12, rows 14 and 16 and a plurality of vertical columns A, B, C, and D. HTML Tables will naturally collapse around the widest cell in a column if the column width attribute is not set (or declared) to some pixel width or percentage width. For example, ColumnA, the cell in row #2 is the widest. In Column B, the cell in row #1 is the widest. However, in Column C, the cell that contains the text, "Column C" in the header row is the widest of all rows, including row #1 and row #2. In this example, an HTML table without any width attributes that are declared will naturally collapse or shrink around the widest cell for each column.

This invention provides a method of organizing a display wherein a single datagrid is designed with individual tags and controls to make the fixed header section. FIG. 11 illustrates such a datagrid containing a header and another datagrid directly underneath the datagrid contain the header with two rows and a plurality of vertical columns. In this illustration, since the data is separated from the datagrid containing the header, it is natural for the table to shrink to the minimum column width if no other table and C1 cell width settings are declared.

The method of displaying tabular data of the present invention can be accomplished by "swapping" and "hiding" steps, where some of the data is invisible to a viewer. First, the software creator or web page designer determines the maximum cell width for each column on the scrollable data table, which will become a visible bottom table. In effect, the designer determines what information to swap between the tables. Then, a copy of the contents of each cell that is the maximum width for its column is placed in a non-visible row in the fixed Header table. The header table is positioned above the Data table. Then, the designer determines if the header content for each cell in the fixed Header table (top table) is larger in width (text or HTML) than the maximum cell width of the scrollable Data table (bottom table). If the header content is wider, then the designer places a copy of the header in an extra non-visible row in the scrollable Data table. The designer makes the swapped information non-visible in the holder-type rows, hiding the swapped copies in each table. Optionally, the designer adjusts any swapped images (if any) to have the height value of 1 (or to be more general a smaller height) bearing in mind that certain browsers need to halve at least a height of one (1) to be able to sense that the images is there for the column to adjust. Some browsers will still respond to a zero (0) height. The records to be copied into the hidden first sub-table are assigned a pre-determined height adjusted to a pre-determined geometric attribute value (height and width) prior to copying the records into the hidden part of the first sub-table.

As a result of the "swapping," there are two tables with the same number of columns. If the widest cell in the same column of one table is larger than the one in the opposite table, than a copy of that text is placed in the opposite table thereby increasing the width of the opposite table to be identical to that of the originating table. The same steps are repeated, except from the opposite table to the originating table. This process balances and equalizes the widths of text or HTML for each column for the two tables, the Header table and the Data table. As a result, the widths of the vertical columns of both tables are aligned with each other. If desired, the order of the above algorithm can be re-arranged in the code, but the overall method and concept remain the same.

In an example shown in FIG. 1, a table 20 is formed with a Header table 22 and a Data table 24 positioned below the Header table 22. The Header table 22 contains a visible Header Cell A designated by numeral 26 and a Hidden Header Cell A designated by numeral 28. The bottom Data table 24 contains a first visible Data Cell A1 designated by numeral 30 and a second visible Data Cell A2 designated by numeral 32. A Hidden Data Cell A designated by numeral 34 is positioned below the second Data Cell 32. The Hidden Data Cell 34 is used as a place holder from data derived from the Header table 22 and the Header Cell 26. The Hidden header Cell 28 expands or contracts width-wise depending on the type of information placed in the visible Data Cells 30 and 32. Typically, the wider of first or second Data Cells 30, 32 is chosen as a guide, and a copy of that information is placed in the Hidden Header Cell 28. Similarly, if the contents of the visible Header cell 26 are wider than any of the Data cells 30, 32, a copy or representative of the Header cell 26 is placed in the Hidden Data cell 34.

As a result of "swapping" and "hiding," the designer creates two tables, a top Header table 22 and a bottom Data table 24 that have the same display width and accordingly the same width column-wise resulting in alignment of the borders of the two tables, Header table 22 and Data table 24.

Figure 2:
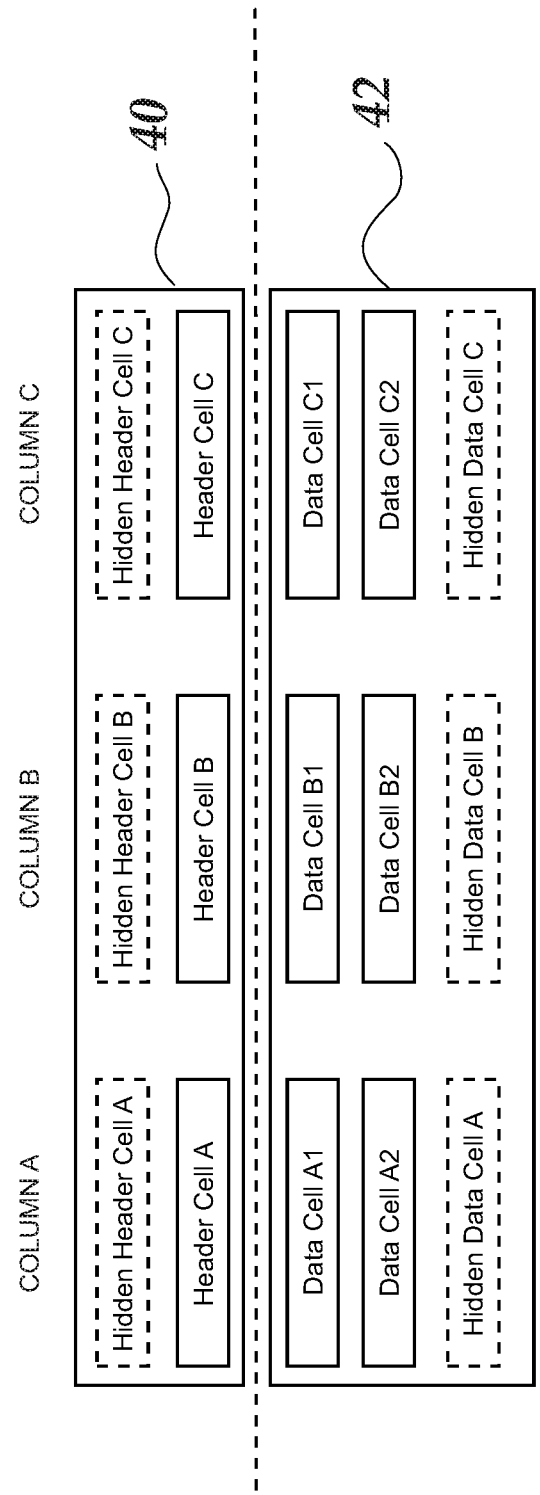
FIG. 2 is a schematic view of a multi-column table, with each column having a header and one or more data cells.

FIG. 2 illustrates application of the above-described steps in a multi-column environment. Here, a Header table 40 has three visible Header cells A, B and C for the respective columns A, B and C, as well as Hidden Header cells A, B, and C for columns A, B, and C. The Data table 42 positioned below the Header table 40 has one or more data cells A1, B1, C1 and optionally Data cells A2, B2 and C2. The Hidden Data cells for each respective column are positioned below the Data cells A2, B2 and C2. For each column A, B, and C, the widest display width of a column of Data Cells in the Data table 42 is determined. For example, the widest width in text or HTML of Data cell A1 or A2 is determined and then contents of the Hidden Header cell A is filled with the wider value of Data cell A1 or A2 to achieve the same resulting width equivalent to the widest width of column A of the Data table 42.

Figure 3:
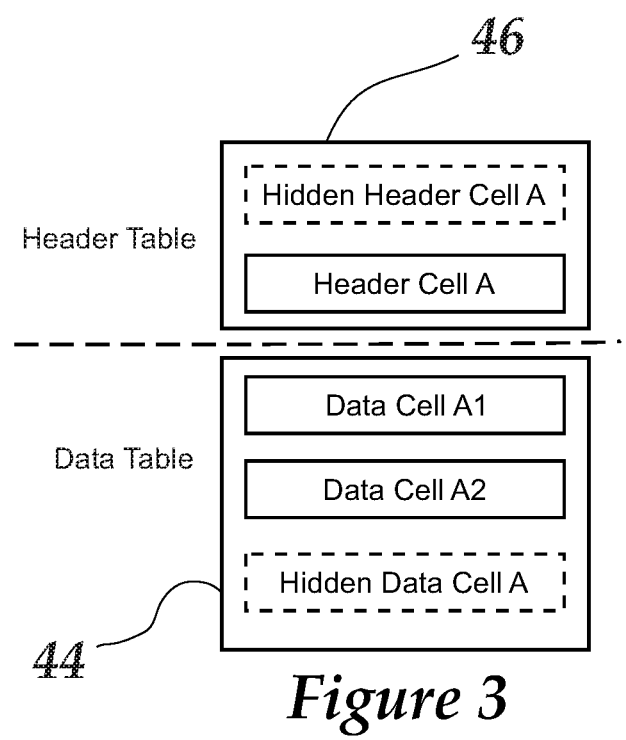
FIG. 3 is a schematic view of a one-column data display having hidden header and hidden data cell.

FIG. 3 illustrates an example of a situation where the widest display from both the Header table and the Data table is replicated in the opposite table's Hidden row/cell. In the method of designing a stationary Header, the designer first determines if Data cell A1 in the Data table 44 has a display width that is greater than in the Data cell A2. The "display width" is the total character width and image width in a line. If there are multiple lines, then the line with the largest total character widths and images is chosen. A character width's units can be in pixels, points, em's, or any other absolute or relative measurement unit. FIGS. 12-14 show examples for the size for each letter and size determination for a phrase that call be in a data or header cell.

If the Data cell A2 is wider in text or HTML, then a copy of the contents or representation of the contents of Data cell A2 is placed in the Hidden Header cell A of the Header table 46. Conversely, if the contents of the Header cell A occupy more display width than Data cell A1 or Data cell A2, a copy of the Header cell A or a representation of the contents of the Header cell A is placed in Hidden data cell A below the Data cell A2. Both Hidden Header cell A and Hidden Data cell A use the cascading style sheet property: visibility: hidden; and line-height; 1 px;

If there are images that will be placed in Hidden Header cell A or Hidden Data cell B, then the height of the images will be modified to be height="1" or height="0". The steps of comparing the widths of the display and then copying the contents in the Hidden Header or Hidden Data cells are repeated for the next column. As a result, the Header Table 46 and the Data table 44 will have equal widths and accordingly the same vertical column alignment, widths and border alignments.

FIG. 4 shows an example of a table with a fixed or stationary Header with Hidden rows viewable on a user's screen. The Hidden row area in the Hidden Header row 48 is partially duplicated from the visible Header and data areas, the areas that have the largest "display widths." The first visible row 50 contains a first column 52 identified as "Order #ID," a second column 54 identified as "Customer ID," a third column 56 is identified as "Ship Name," a fourth column 58 is identified as "Order Date," and a fifth column 60 is identified as "Ship Country." The widest text in the third column 56 "Vins et alcools Chevalier" visible in the row across from Order #10248 in the visible Data Table 68 controls the width of the Hidden Header cell 62 and Hidden Data cell 64 in the Hidden Data row 66.

In the illustration shown in FIG. 5, no scrollbar is shown. In this illustration, the Header cell 70 is the widest display of the respective column 72. The Header cell 70 is also wider than the text in the Data table 74 for the Column 72. The Hidden Header cell 76 contains data replicated from the Header cell 70. The image was reduced to a height of "1" so that it will be hidden in the future. The same text, being widest for the column is reproduced in the Hidden Data cell 78, which occupies the row at the very bottom of the column. However, it should be noted that the Hidden Data cell may be positioned in the middle of the column or at the very top of the column, depending on the designer's preference.

FIG. 6 presents an illustration wherein one of the Data cells is the widest in the column. In this illustration, Data cell 80 presents the largest display width for column 82. The same data is replicated in the Hidden Header 86 and the Hidden Data table cell 88. Although the Hidden Header 86 and Hidden Data table cells 88 can be seen in FIG. 6, it will be understood that a CSS style property will be used to "hide" these contents. For instance, CSS properties visibility: hidden; and line-height: 1 px; can be used to hide the Hidden Header cell 86 and the Hidden Data table cell 88.

Figure 7:
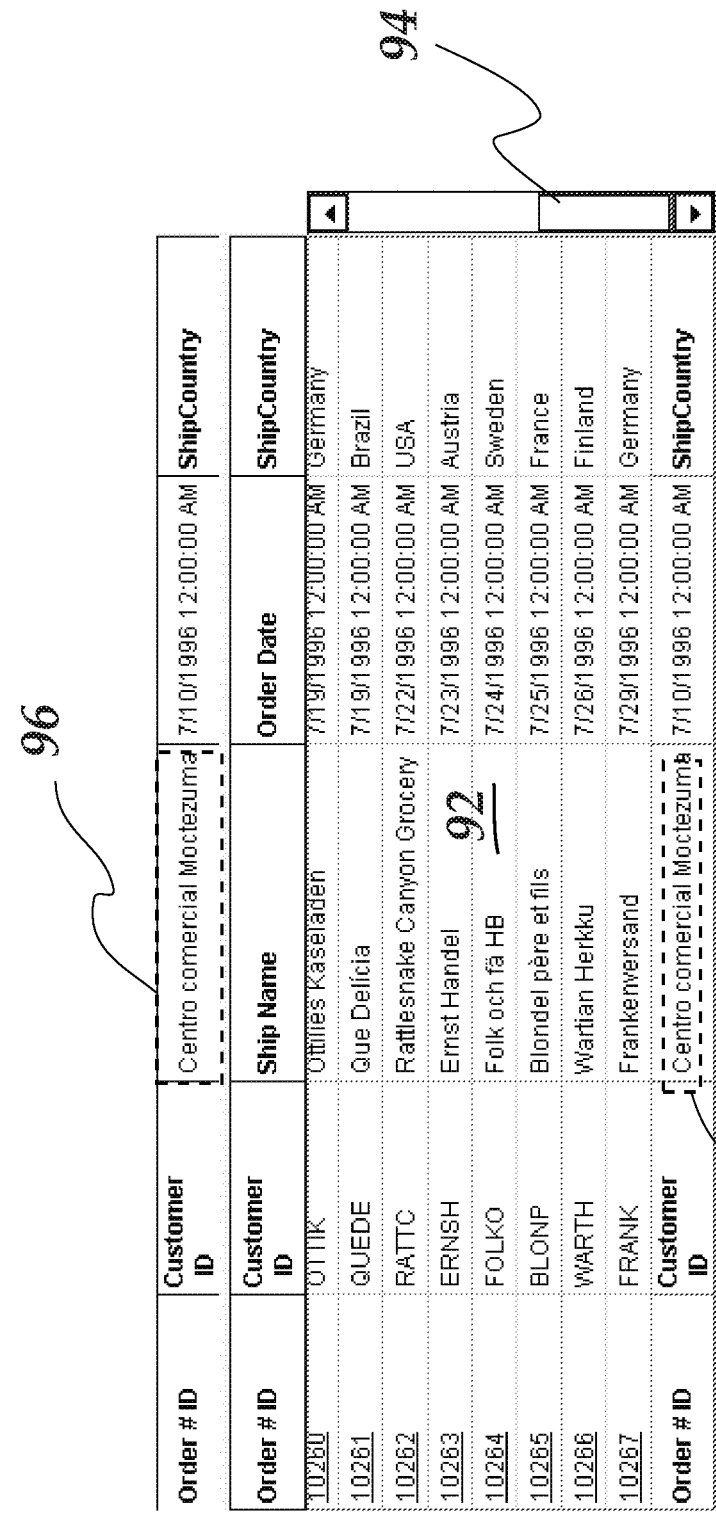
FIG. 7 is an illustration of a table with hidden data cell contents being the widest display of the column.

FIG. 7 illustrates a display where one of the Data cells, in this case Data cell 90, is the widest in the column. The text in the Hidden Data cell 90 has been derived from the text, which appears somewhere in the Column 92 and is not visible in the illustration since the user used a scrollbar 94 to move down along the columns 92 with respect to the text "Centro commercial Moctezuma." If there are several pages of data in the table, the widest data value could be in the pages not currently visible within the browser even if the user moves down the scrollbar. The Hidden Header cell 96 is adjusted to have the same width as the Hidden Data cell 90. The scrollbar 94 can be created with <DIV> tags and the CSS attributes: height and overflow-x and overflow-y.

FIG. 8 illustrates a Code Snippet 98 of CSS style sheet that may be used to hide the hidden rows (place holder rows). In this illustration, the hidden rows of the Header cells and Data cells have been hidden and are not visible to the user.

FIG. 9 illustrates a multi-column dropdown box with a Stationary Header in a collapsed and expanded state. As the multi-column dropdown box used more <DIV> tags that will make the Data table and its Header row be hidden or disappear. As a result, the display on the user's computer terminal will look like the Collapsed State view in FIG. 9. An extra <DIV> tag surrounds the entire Data table as well as the Header table. Another program method or function controls the <DIV> attributes, making it hidden or not hidden.

FIGS. 12, 13, and 14 show the actual character widths used, in pixels, to determine the text width within a cell. FIGS. 12 and 13 provide a sample of possible character widths for "Geneva" and "Times" fonts, providing units in Pixels for conventional font sizes. Different fonts have different widths as well. Also, within the same font, the point sizes call have different relative widths when compared to other point sizes. Because there are so many different sizes and variations, it is preferred to make a hidden copy and let the user's browser perform the sizing operation. FIG. 14 illustrates a sample display width determination for the phrase "New Orleans Saints," with the total size being 94.21223 pixels.

FIGS. 12 and 13 also show that many characters have the same width within the same font group or match character widths from other font groups. Accordingly, the present invention can substitute other characters or a combination of other characters for the original characters in the Hidden Header cell 86 and the Hidden Data cell 88 to adjust the width of the column. Encrypted or "representative" data can be used to also adjust the widths of the columns. Thus, instead of copying data to the Hidden Header cell 86, an association call be made between the Hidden Header cell 86 and the maximum data cell in a column and then "representative" data is copied into the Hidden Header cell 86. Likewise, the same association call be done for the Hidden Data cell 88 and Header cell where representative data is copied into the Hidden Data cell 88.

Font style is important in determining character width because the text in the header cell can be a different font style, weight and size from the font style text in the data cells. Typically, the header can be a different font style, size, and weight when compared to the font used in the data. For example, the header of each data column can many times be of a bold font weight and sometimes a larger font size whereas the data in the data cells is plain and almost always equal, or smaller in size, than the header font.

One cannot easily obtain the exact width in pixels of a character based on font sizes, styles and weights. To get sub-pixel accuracy, programming outside of the typical HTML, CSS, JavaScript and the Internet languages could be used. Or another programming language may have to be used to get the actual pixel widths for each character in its appropriate font family, style, size and weight. These widths, typically in fractions of a pixel are then summed together to get a total text width. This can be done "server-side" so as to get the maximum text width of all the selected data in the database query.

Furthermore, to get the most narrow table width, the columns widths of the table should not be set to a percentage or a pixel width. That is, the overall table width and/or columns width should be set via HTML and/or CSS to be auto collapsing. This can be complicated as one can set the table widths and/or one or more columns widths to get the same result but it most likely would be a tedious, time consuming exercise and this also might not work properly.

Generally, the table width (e.g. <table>) should not be set for both the header table and data table. Nor should any of the table column widths (e.g. <td>) be set for either the header table or data table. If there are sorting direction arrows, either in text format (or images format) in the header, those arrow widths also has to be added to the content width. Also if the data in a cell is more than two lines long, the text width must be determined for each line in the cell, and then the maximum single line width is used to compare to the other cells and the header.

The present invention also provides an alternative method of creating display tables which have "stationary" headers. According to the alternative method the software program first determines the maximum cell width for each column on the scrollable Data table, or bottom table. The program then determines whether the Header contents for each cell in the fixed top table is larger in width than the maximum cell width of the scrollable table (bottom table). At the next step, the program determines the minimum column widths and sets each column in both tables to the same minimum column width, thereby aligning the fixed top table with the scrollable bottom table.

Since setting the width of the table cell <td> can also control the width of the column, the program, instead of putting place holder data inside the hidden cell, as discussed in the first embodiment of the present invention, can simply determine the cell with maximum width of each column and then determined what the width attribute of the <td> cell should be, <td width="maximum determined number in pixels">

It is envisioned that the alternative method may require certain setting of the table cell's width, <td width="in pixels">. For instance, if a programmer wishes to set the table to be 100% width, the fixed <td>'s may not flow and stretch as easily and cleanly as not setting the width of the <td> to begin with. Such situation may be encountered when for instance, a cell has a lot of text that needs to wrap to the next line down. Sometimes it is desirable for the website to have the table to be 100% width and take up as much room as possible width wise. And sometimes it's desirable for the table to shrink to the smallest possible width to save space.

There are numerous ways, by which a program can set the column width. For instance, the column width may be determined by setting the <td> width attribute to: (1) a pixel value, or (2) a percentage value, or (3) by setting no values and letting the contents inside the cell determine the width of the cell. Furthermore, adjacent column contents and width attribute value can also affect the column width, especially the percentage widths. Even then, a programmer may encounter situations where tabular data to be displayed has multiple lines, some short, some combined with images, with the headers having images, or text, or a combination thereof. The determined font size of each character can change from browser to browser. The windows size that the user set his/her browser, the resolution, etc. Each tint type has subtle changes between one program to another program, including those main stream and standards compliant browser programs. These slight differences can be seen in a program or browser when the column of the headers do not align perfectly with the data columns.

Figures 15A, 15B:
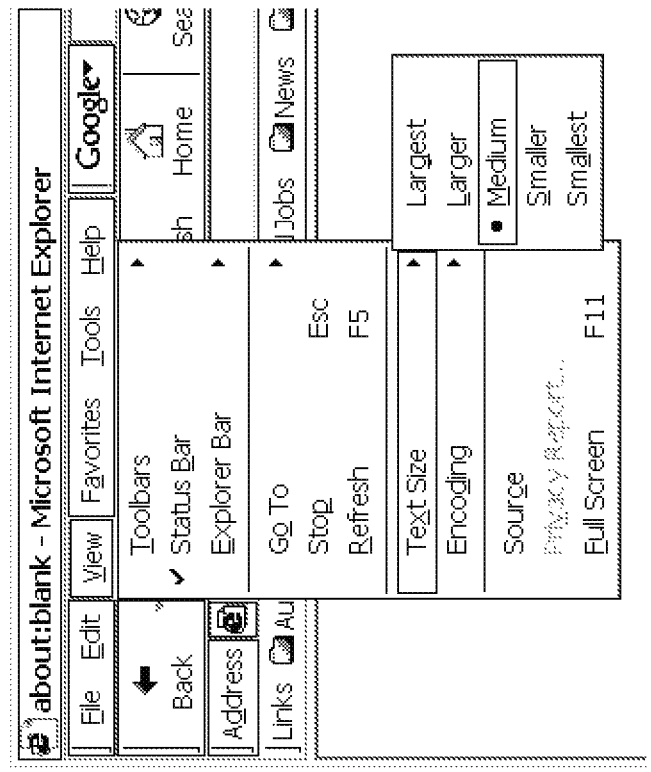
FIG. 15A is an illustration of two tables.
FIG. 15B is an illustration of a Web page where a user can change the text size setting displaying the two tables, even while the two tables have the same <TD> width values, which will not align properly.

The two tables illustrated in FIG. 15A have the same TD values for the width attribute. The cell code and width values of the top table in FIG. 15A are below:
    <td width="50"> </td>
    <td width="45"> </td>
    <td width="65"> </td>

As one can see in the two tables in FIG. 15A, the columns are in alignment with each other. For illustration purposes, a space has been placed between the two tables so one can see that they are actually separate. But in practice, the two tables are closer together, vertically, and even in contact with each other. However, it is possible that should a user change the text size setting in the tables via the browser option shown in FIG. 15B, the two tables shown will start to expand at different rates as the user changes the text size setting in their browser. Thus, the two tables will have their columns out of alignment with each other. If the fonts inside the fixed header are fixed to a pixel setting, as opposed to an adjustable setting, it is envisioned that the table columns will align in at least the browser entitled "Internet Explorer" and perhaps when using other browsers. Thus, instead of setting the width of each column, the program should determine the maximum cell width for each column, if the program wishes all the columns to still align properly.

The multi-column drop down list described in this application shows that it can finally be done on a production quality level that is cross-browser compliant. The multi-column drop down list uses practically the same swapping and synchronizing for the selected data rows as that described in the stationary leader table above. This third (3.sup.rd) table has hidden rows via CSS that are still populated with the correct data such that the columns width will still be aligned with the other data table columns and header table Columns. Additionally, when a user selects an item in the Data table, that item is populated in this third table.

It is envisioned that many computer languages can be used to implement the instant method of creating a data table with a stationary header. It should be noted that to implement the instant method, the user may employ the server of a "client/server" configuration, a client's browser via a language like JavaScript or Java or VBScript. Furthermore, parts of this method can take place on both the web server and the client.

With regards to the server-side languages, there are many to choose from. For example, lava, J2EE, Perl, PHP, Cold-Fusion, Python, Visual Basic, ASP.NET, C#, J#, JSP, HTML, machine, or assembly language can be used to implement the method described here. The data for these tables will typically come from a database such as MS Access, SQL Server, IBM DB2, Oracle, MySQL, etc. Nevertheless, it can also come from an XML file, flat file, JavaScript Object, or some customized data format. The data retrieval can also use a method referred to as AJAX, asynchronous JavaScript and XML to improve performance and response time to between the server and the client browser. Again, the variations are different in regards to languages and databases used, but the same method of creating a stationary header and aligning the columns can and is still used.

An additional feature of the present invention is a method of making a fixed side bar of a cell that adjusts to the data cell row height but also scrolls up and down and stays in vertical synchronization with the main fixed header table while this main header table is scrolled left or right to see hidden columns. This task may appear somewhat easier than creating a fixed header as there typically can be only 1, 2, 3, etc. lines in height. Still, if a full spreadsheet program such is Excel, with its large feature set, were to be implemented using this invention, the program may get rather sophisticated.

In forming a fixed side bar, the same concept of swapping for the place holder column is used. The program looks for the number of line breaks and performs the data cell swap accordingly. Thus, there are two side-by-side Fixed header tables where, for example, the entire left fixed header table acts also as a Fixed Sidebar. The scrollbar for the left header table is either removed or somehow hidden, but, through some programming language, the Fixed Sidebar Table scrollbar position remains in sync with the main fixed header table's scrollbars position.

Figures 16, 17:
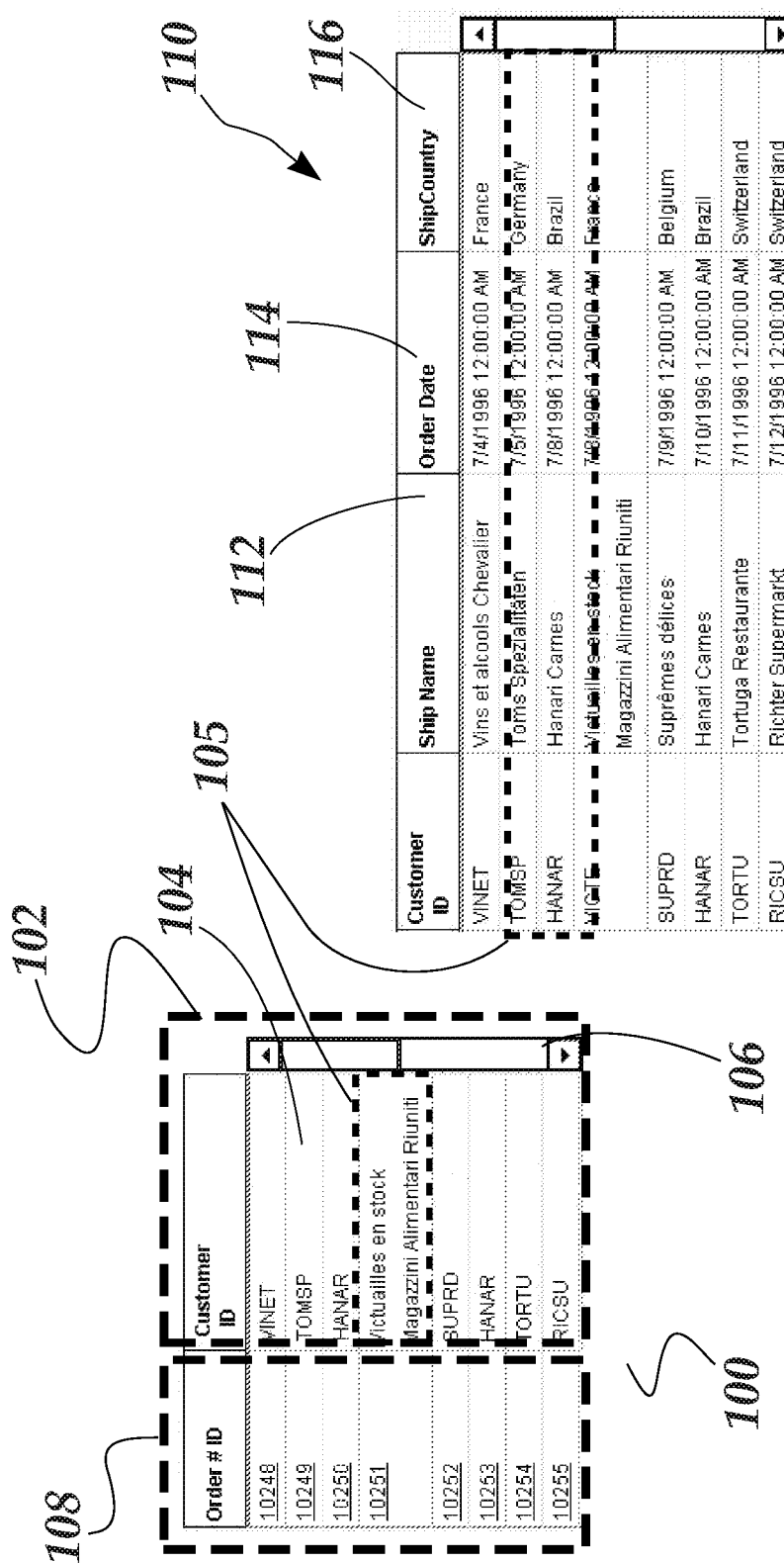
FIG. 16 is an illustration of a fixed sidebar table.
FIG. 17 illustrates a step of determining the largest height cell in the main data table.

Referring to FIGS. 16 and 17, a place fixed sidebar table 100 comprising a place holder column 102 and a fixed sidebar column 108 is illustrated. The place holder column 102 has a Header "Customer ID" and a plurality of Data cells 104. One of the Data cells 105 has the largest amount of information and consequently has the largest height value.

A sliding scrollbar 106 is shown on the right of the place holder column 102. The fixed sidebar column 108 is shown to the left of the place holder column 100. The main data table 110 may contain additional columns, such as shown in FIG. 17, where a "Ship Name" column 112, "Order Date" column 114 and "Ship Country" column 116 are added. Of course, the main table may contain only one column, depending on the nature of the displayed data.

In the process of designing a fixed sidebar, one of the steps provides for hiding the place holder column 102 and the scrollbar 106 of the fixed sidebar table by the main data table 110 using a CSS property, for instance CSS z-index layers, while still leaving the fixed sidebar column 108 visible. The place holder column 102 is created by determining the cell in the main data table 110 or sidebar table 100 that has the largest height value. In this illustration, it is cell 105. Similarly, if the cell has only text, the value is determined based on the number of lines, carriage returns or HTML <BR> or <P> tags.

Figure 18:
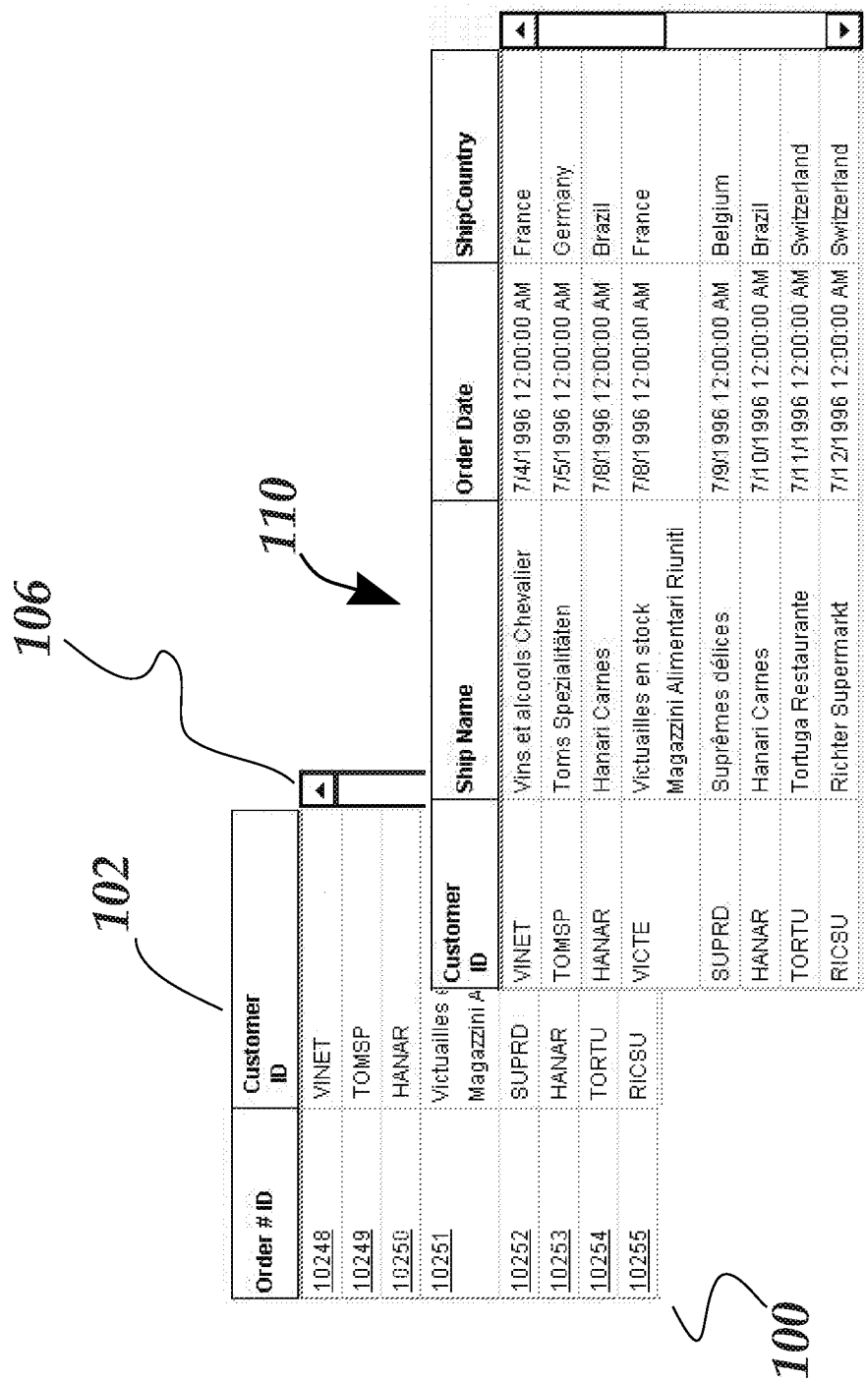
FIG. 18 illustrates a step in a process where a main data table is positioned on top of a scrollbar of a fixed sidebar table and a place holder column.

As call be seen in FIG. 18, the Main Data table 110 partially covers (is placed "on top of") the fixed sidebar table 100, the place holder column 102 and the scrollbar 106 of the fixed sidebar table 100. Thus, when the main table indicia cover the scrollbar 106 of the fixed sidebar table 100, both the table 100 and the table 110 may appear as one table.

FIG. 19 illustrates another variation of the application of the instant invention to a display page, where two fixed header tables are presented, with one of the tables acting as a fixed sidebar table. In this illustration, a large table 112 has a fixed sidebar table 114 and a plurality of data columns 115. The fixed sidebar table 114 acts as fixed column that does not change when a horizontal scrollbar 116 is used or moved left or right. The horizontal scrollbar 116 is placed on the bottom of the table, allowing the user to move the main data table 118 horizontally to see other columns of data to the left or right. A vertical scrollbar 120 allows the user to scroll the main table up and down, while the header may or may not remain fixed, depending on the choice of the program designer.

The present invention allows a program designer to create a column sidebar with two fixed header tables that use the same data for two side by side tables. The main table "overlaps" or covers the fixed sidebar table so that the place holder column and the scrollbar of the fixed sidebar table are hidden via some CSS Property (or other similar means) that can be used to hide the fixed sidebar table's place holder column and scrollbar.

Additionally, the main table's vertical scrollbar is synchronized with the fixed sidebar's scrollbar so that the rows in both tables are aligned with respect to each other. This can be done via the swapping method of data and looking for the cell with the greatest height and introducing the data in the fixed sidebar table's option as well as hidden 2.sup.nd column. Both tables have the same vertical position scrollbar position with respect to each other when scrolling up or down. This can be done via a client side JavaScript script in the web page in a variety of ways.

By horizontally scrolling left or right in the main data table, the fixed header table's header and data from a hidden column are swapped into the next visible column's location while a visible column in the main data table (left or right, depending upon the direction of scrolling) is made hidden. The computer program code of the present invention call be embodied in a conventional computer-readable medium and executed by a computer for displaying the table data on a screen. In effect, the instant invention creates a table with a scrollable part and a non-scrollable part in each data cell.

The method of the present invention provides for a method and computer-executable program code for defining a set total value of height-or-width characters and/or images based on the character spacing and alignment within each cell in order to create a record of the database arranged in a record table having columns, rows and a plurality of cells defined by the columns and rows. The computer-executable program code and method is capable of determining maximum height-or-width character and/or image parameters within a cell for each column or row in the record table based on records to be displayed in a cell that will have the maximum height-or-width parameters. The computer-executable program code and method is capable of establishing a first sub-table defining a non-scrollable part of each column. These features of the invention are explained with reference to FIGS. 20-25B.

Figure 20:
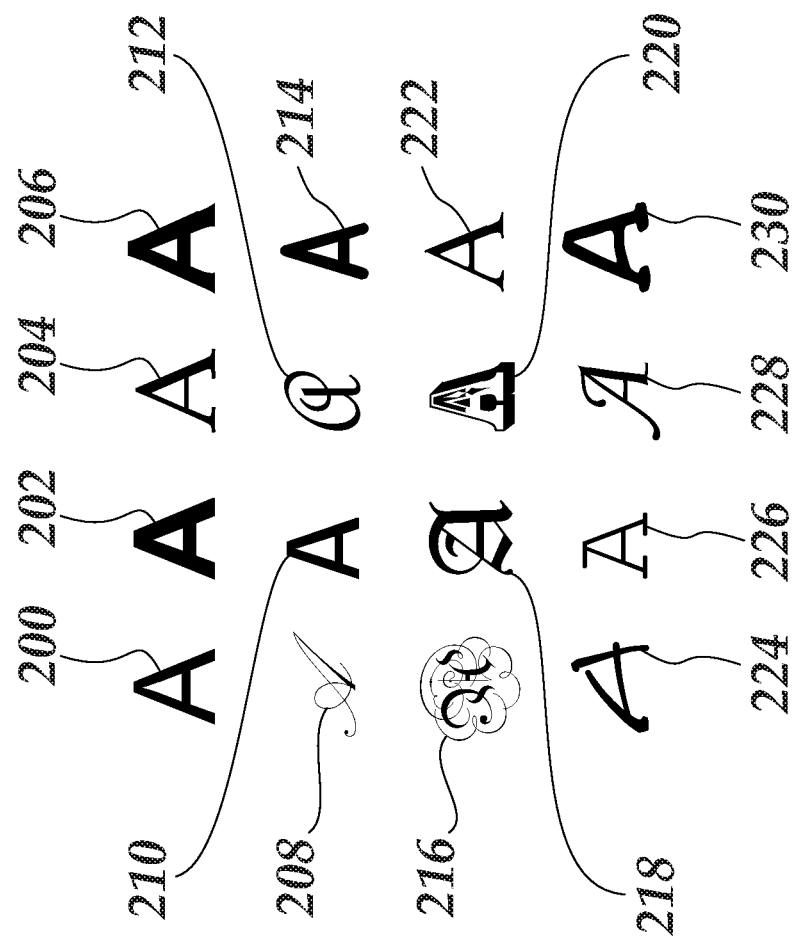
FIG. 20 illustrates the character "A" in sixteen different font types by using glyphs, which are pictures or images of a single character.

FIG. 20 illustrates the character "A" in sixteen different exemplary font types by using pictures or images designated by numerals 200, 202, 204, 206, 208, 210, 212, 214, 216, 218, 220, 222, 224, 226, 228, and 230. Of course other images may be used as exemplary, and the representations in FIG. 20 are for illustrative purposes only. For the purposes of explanation, it is recognized that each glyph in the font has a bounding box, a rectangle positioned in a theoretical rectangular cell. The most extreme nodes of the glyph determine the bounding box. Each glyph usually also has sidebearings: extra space to the left of bounding box (left sidebearing, LSB) and to the right (right sidebearing, RSB). The sum of the sidebearings and the bounding box width define the advance width (often just called width). The intersection of the baseline and the left sidebearing is called the zero point. Horizontal (x) node coordinates to the right of the LSB line are positive and coordinates left of the LSB line are negative. Similarly, vertical (y) node coordinates above the baseline are positive and those below the baseline are negative.

The images of character "A" can be sometimes referred to as glyphs. A glyph is the actual picture of the character "A" for a particular font. For instance, the image designated by numeral 200 is the character "A" using the font family Arial; image 202 is the character "A" using the font family Arial Bold; image 204 is the character "A" using the font family Palatino Linotype; image 206 is the character "A" using the font family Albertus; image 208 is the character "A" using the font family Palace Stript MT. An image 210 is the character "A" using the font family Consolas; image 212 is the character "A" using the font family French Script MT; image 214 is the character "A" using the font family OCR A Standard. An image 216 is the character "A" using the font family Parchment. An image 218 is the character "A" using the font family Old English Text MT. An image 220 is the character "A" using the font family Rosewood Standard Regular. An image 222 is the character "A" using the font family Goudy Old Style. An image 224 is the character "A" using the font family Calvinital. An image 226 is the character "A" using the font family Courier New. An image 228 is the character "A" using the font family Monotype Corvisa. An image 230 is the character "A" using the font family Toledo. While the images designated by numerals 200, 202, 204, 206, 208, 210, 212, 214, 216, 218, 220, 222, 224, 226, 228, and 230 represent the character "A," they all use unique images.

It should also be noted that within the same font, the same character can be represented by many different glyphs. Furthermore, sometimes a glyph that looks the same as another glyph in the same font can represent a different character especially on a computer. A set of pictures (images) or glyphs represent a font. A font can sometimes refer to a set of glyphs of one size and one style or a font can also refer to many different sizes. A font family usually refers to all the different sizes and styles that all have some similar idea.

Figure 21:
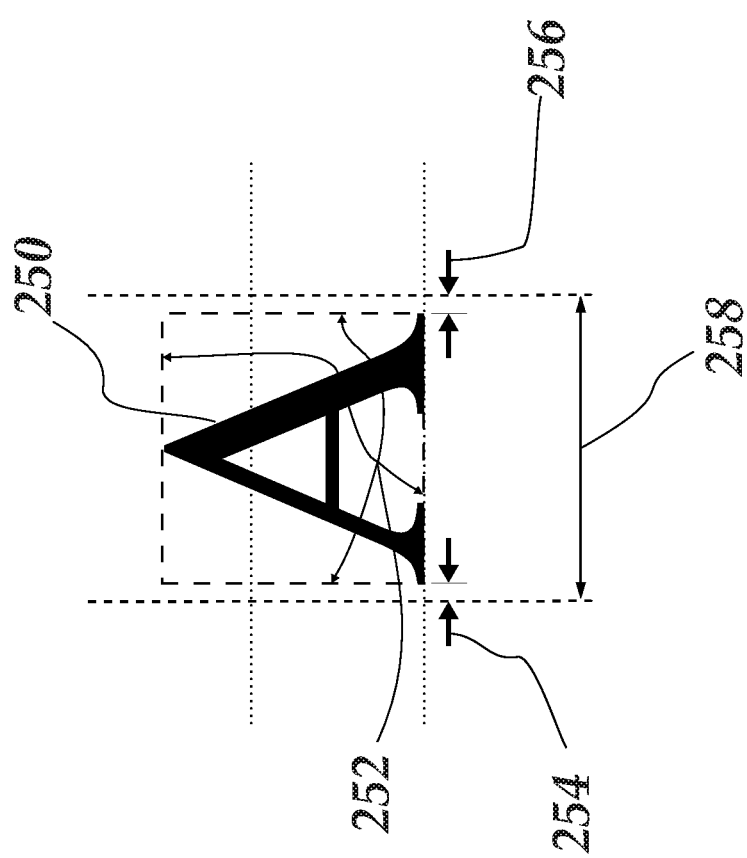
FIG. 21 illustrates the horizontal font metrics of the character "A"

FIG. 21 illustrates the horizontal metrics of the character "A" of the font family, Times New Roman, a glyph 250. The glyph 250 is surrounded or bounded by a box 252 usually referred to as a "bounding box" or "bounding rectangle." To the left of the bounding box 252 is the left side bearing 254. Similarly, to the right of bounding box 252 is the right side bearing 256. The sum of the bounding box 252 width and the left side bearing 254 and the right side bearing 256 is sometimes referred to as the advance width 258. The maximum width-and-height cell parameters can be determined by the bounding box and the right-left side bearings.

Figure 22A:
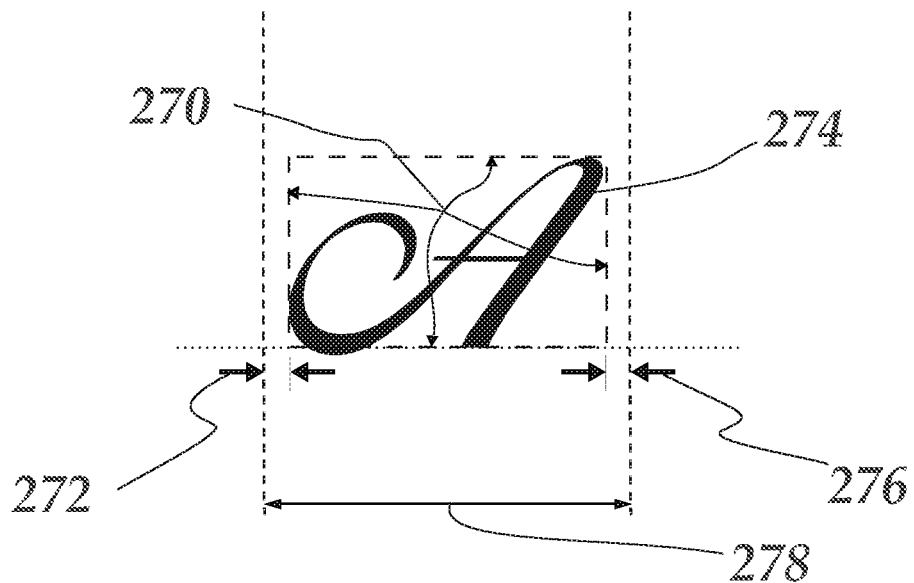
FIGS. 22A and 22B illustrate the use of a horizontal line, sometimes called a "measurement line" to provide an alternative method in determining the left and right side bearings, where
Figure 22B:
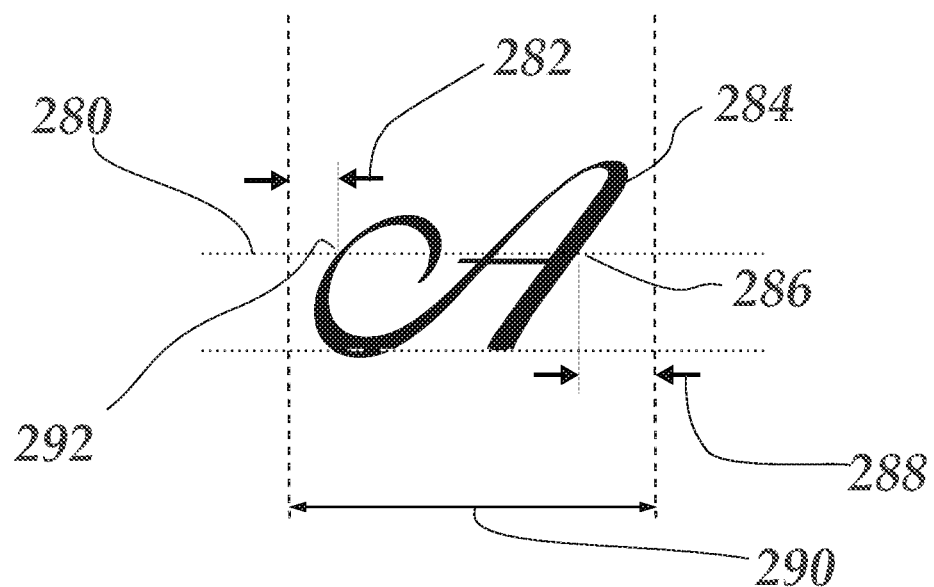

FIGS. 22A and 22B illustrate the use of a horizontal line 280, sometimes referred to as a measurement line, to provide an alternative method in determining the left and right side bearings in contrast to using the bounding box or bounding rectangle 270 to determine the left and right side bearings. The glyphs 274 and 284 are identical and both represent the same character, font family, font size and style, Margaret, a True Type font. The left side bearing 272 and the right side bearing 276 are determined using the bounding box 270. Likewise, the advance width 278 is the sum of the bounding box 270 and the left side bearing 272 and the right side bearing 276. However, with the glyph 284, a measurement line 280 is used to determine the left side bearing 282 and the right side bearing 288. The right side bearing 288 is determined from the intersection 286 of the measurement line 280 and the outer edge of glyph's contour or shape. The left side bearing 282 is determined from the intersection 292 of the measurement line 280 and the outer edge of the glyph's contour or shape. Accordingly, the advance width 288 is sum of the width between the intersections 292 and 286 and the left side bearing 282 and the right side bearing 288.

Figure 23:
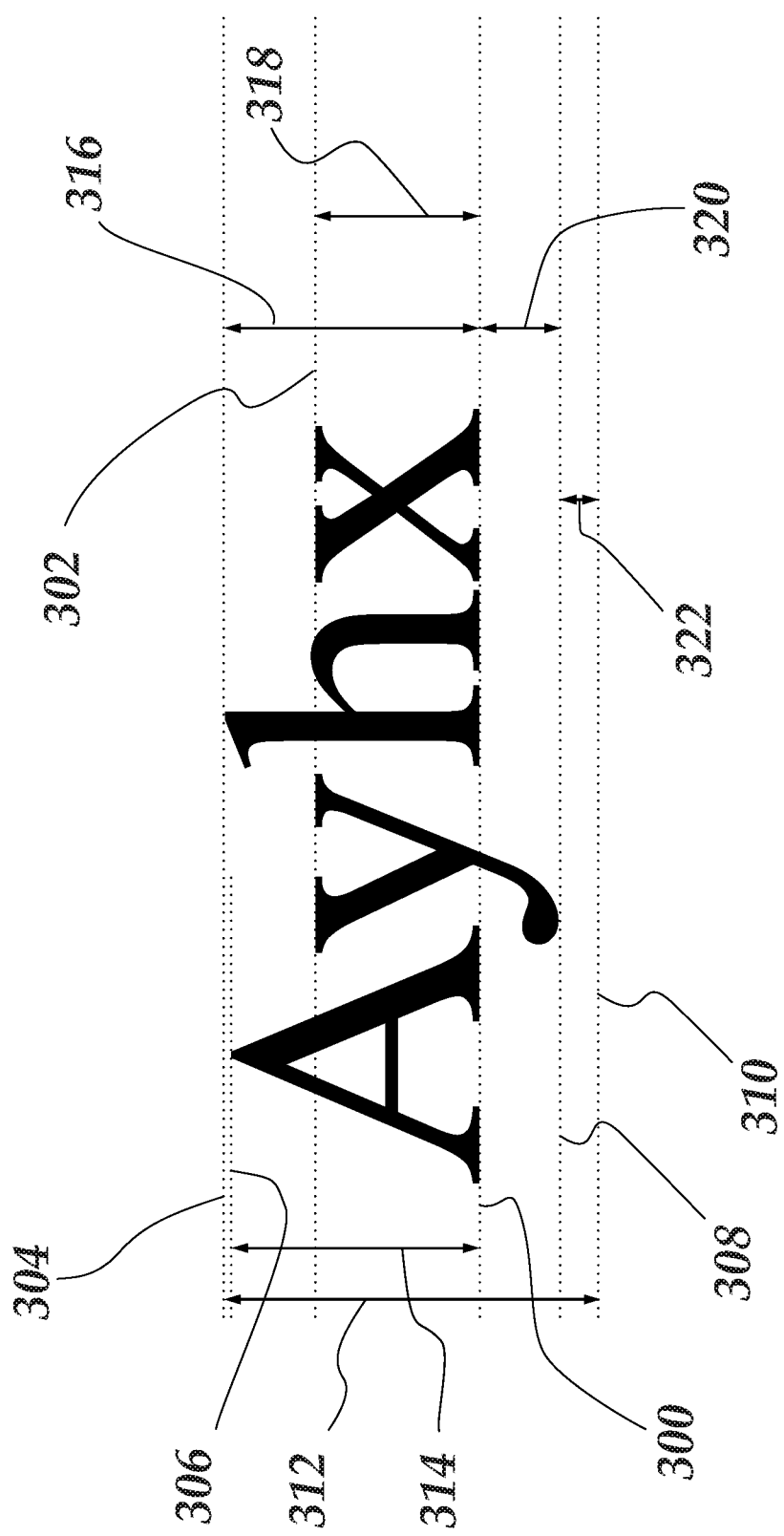
FIG. 23 illustrates the vertical font metrics of the characters "A", "y", "h" and "x"

FIG. 23 illustrates some vertical measuring units used to the determine line height between lines of characters. The baseline 300 intersects the bottom glyphs of character "A" 330, character "h" 334 and character "x" 336. The horizontal x-height guideline 302 intersects the top of the character "x" 336. The horizontal ascender guideline 304 intersects the top of character "h" 334. The horizontal cap height guideline 306 intersects the top of character "A" 330. The horizontal descender guideline 308 intersects the bottom of character "y" 332. The horizontal line 310 represents the next ascender guideline below the baseline 300. The line height 312 is the vertical distance between the current ascender guideline 304 and next ascender guideline 310. The cap height 314 is the vertical distance between the baseline 300 and the cap height guideline 306. The ascender height 316 is the vertical distance between the baseline 300 and the ascender guideline 304. The x-height 318 is the vertical distance between the baseline 300 and the x-height guideline 302. The descender height 320 is the vertical distance between the baseline 300 and the descender guideline 308. The line gap 322 is the vertical distance between the descender guideline 308 and the next ascender guideline 310. The leading is the distance between the one baseline 300 to another baseline, either directly above or below baseline 300.

The term "kerning" as used herein refers the process of adjusting the spacing between characters in a proportional font, usually to achieve a visually pleasing result. Kerning moves the letters closer together (negative spacing) vs. tracking, which moves the letters further apart (positive spacing). In a well-kerned font, the two-dimensional blank spaces between each pair of characters all have similar area. The related term kern denotes a part of a type letter that overhangs the edge of the type block. Kerning is contrasted with tracking. While tracking adjusts the space between characters evenly, regardless of the characters, kerning adjusts the space based on character pairs. There is strong kerning between the V and the A, and no kerning between the S and the T. In typesetting, the term "kerning" is derived from "kern," that portion of a letter that extends into adjacent character space.

Figure 24A:
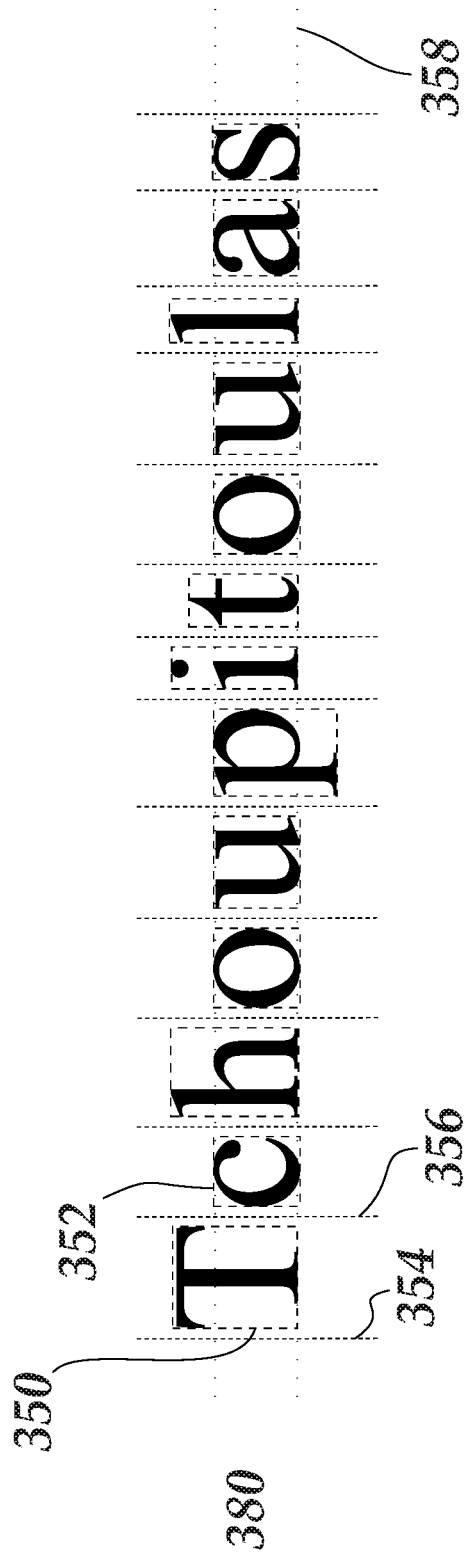
FIG. 24A illustrates the word, "Tchoupitoulas." without the adjustment of horizontal metrics and use of kerning and kerning pairs
Figure 24B:
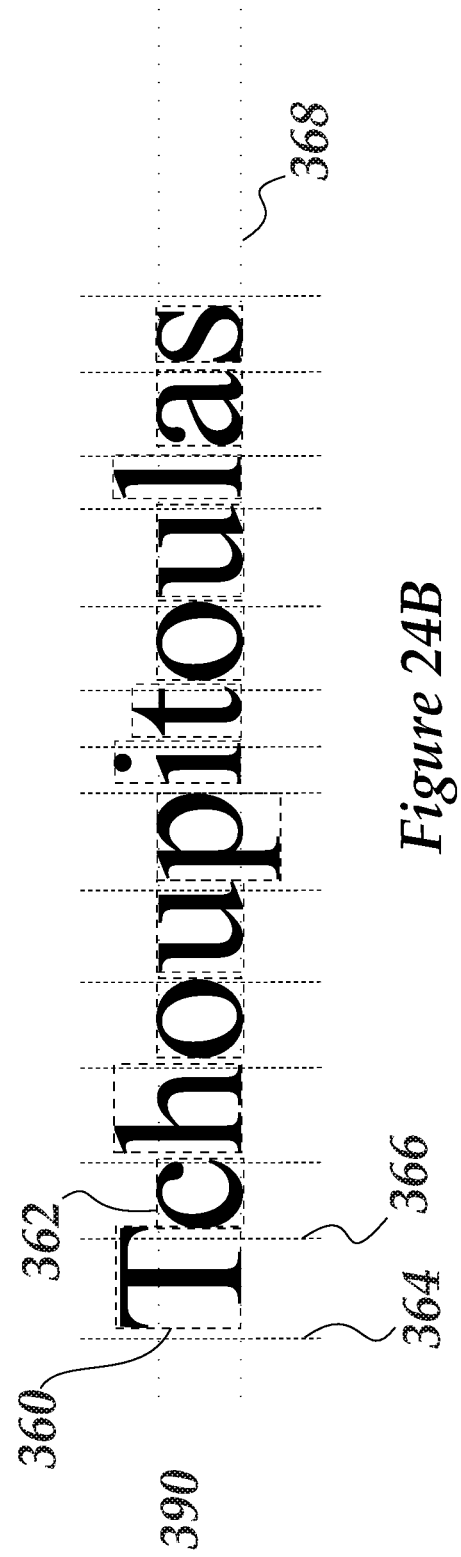
FIG. 24B illustrates the adjustment of horizontal metrics and use of kerning and kerning pairs in the word, "Tchoupitoulas."

FIGS. 24A and 24B illustrate the adjustment of horizontal metrics and use of kerning and kerning pairs using the characters in a word Tchoupitoulas." In the word "Tchoupitoulas" 380, the bounding boxes 350 and 352 do not overlap. The side bearings 354 and 356 are not overlapped by the bounding boxes 350 and 352. However, with the same word, "Tchoupitoulas" 390 shown in FIG. 24b, the bounding boxes 360 and 362 show some overlap or intersection. The bounding box 362 overlaps the bounding box 360 and the side bearing 366. The baselines 358 and 368 are used to measure the advance width, or just width of the characters in "Tchoupitoulas" 380 and 390.

Figure 25A:
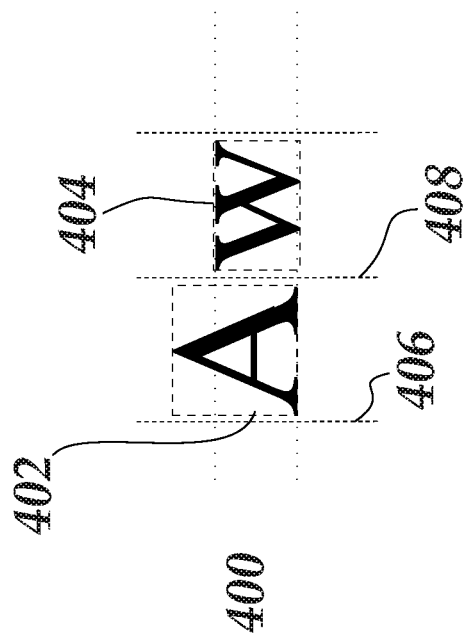
FIG. 25A illustrates two letters without the use of kerning and kerning pairs and FIG. 25B illustrates two letters with the use of kerning and kerning pairs.
Figure 25B:
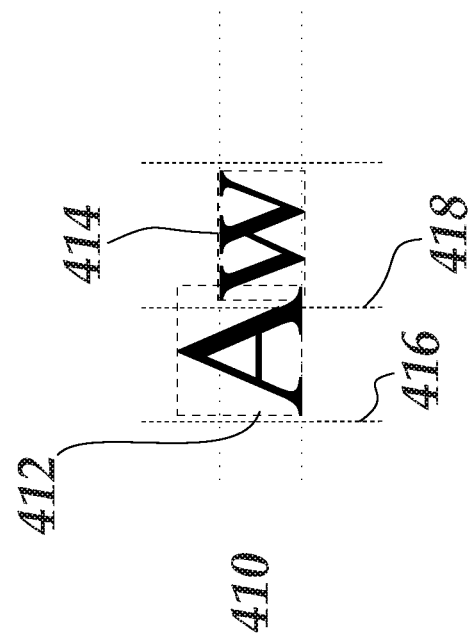

FIGS. 25A and 25B illustrate the use of kerning and kerning pairs. The kerning pair "Aw" 400 is shown not kerned. The bounding box 402 does not overlap bounding box 404 and the side bearing 408 is not intersected. However in the kerning pair "Aw" 410 shown in FIG. 25b, the bounding boxes 412 and 414 overlap and the side bearing 418 is also overlapped by the bounding boxes 412 and 414. The side bearing 406 and 408 remain the same and are not overlapped by bounding boxes 402 and 412, respectively.

FIGS. 20 to 25B are used to explain "font metrics" where font metrics is a method or program to determine the space between characters as well as the alignment of character with respect to each other character. Font metrics also determines the width of the space characters. The spacing widths between characters and words are sometimes referred to as "letterspacing" or "wordspacing," respectively. Font metrics further determines the distance between lines of characters by using features common to all glyphs of a font typically referred to as "line spacing" or "leading."

Figure 26A:
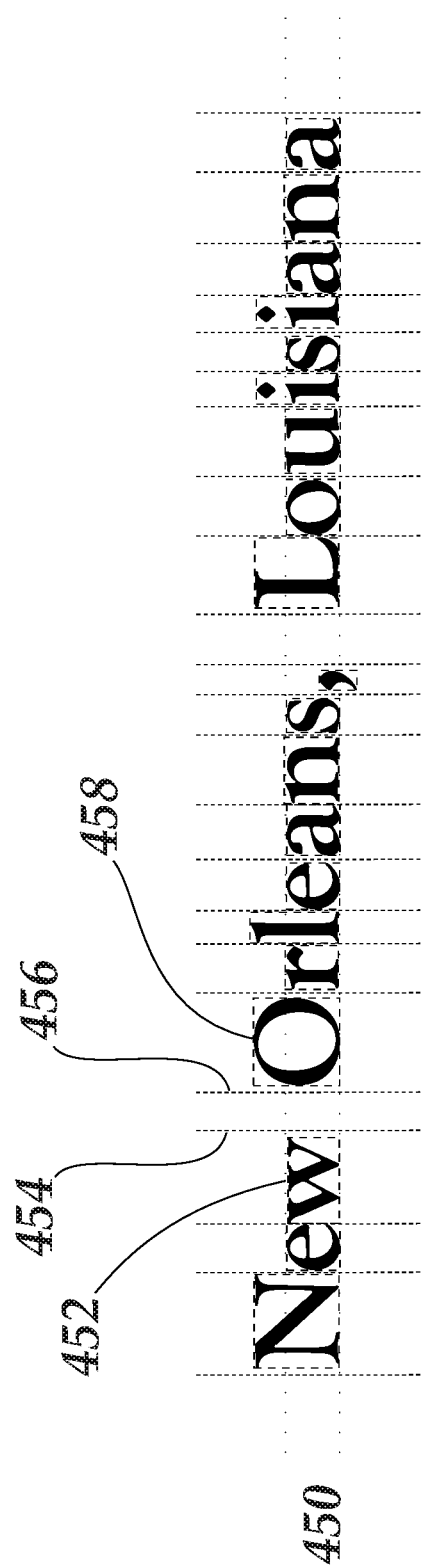
FIG. 26A illustrates the words, "New Orleans, La." without the adjustment of horizontal metrics and wordspacing
Figure 26B:
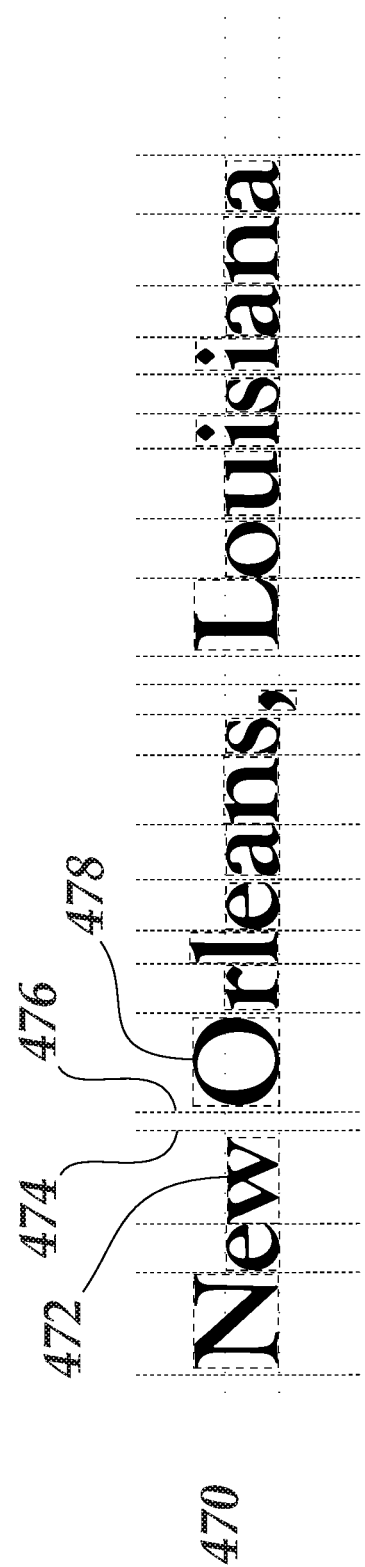
FIG. 26B illustrates the words, "New Orleans, La." with the adjustment of horizontal metrics and wordspacing.

FIGS. 26A and 26B illustrate the use of "wordspacing." In FIG. 26A, the wordspacing between the letter "w" 452 and the letter "O" 458 can be measured by the horizontal distance between the side bearing 454 and side bearing 456. This distance is sometimes referred to as "loose", "tight", "close", or "default" wordspacing. The word spacing as shown in FIG. 26A can be illustrative of "loose" wordspacing. In FIG. 26B, The wordspacing between the letter "w" 472 and the letter "O" 478 is defined by the distance from side bearing 474 and side bearing 476. This wordspacing distance, as shown in FIG. 26B, is sometime referred to as the "default" wordspacing and is determined by the font metrics of the font and/or the computer program or programs displaying the words. This "default" wordspacing can many times be approximately 0.25 cm.

FIGS. 20 to 26B are used to explain "font metrics" where font metrics is a method or program to determine the space between characters as well as the alignment of character with respect to each other character. Font metrics also determines the width of the space characters. The spacing widths between characters and words are sometimes referred to as "letterspacing" or "wordspacing," respectively. Font metrics further determines the distance between lines of characters by using features common to all glyphs of a font typically referred to as "line spacing" or "leading."

The typical units of measurement in font metrics are "points" and "picas". There are six picas in one (1) inch and approximately 72 points in one (1) inch. Other units in font metrics are "em-quads", "em", "en" and "unit", these are relative units. To get these font metrics to work on any device, e.g. computer, printer, PDA, a special computer language was needed. i.e. PostScript, TrueType or OpenType. These languages convert the font metrics and the character outlines and contours, kerning, spacing, hinting, leading, etc. so that these fonts and characters can print properly or display properly on any printer or computer.

The font metrics discussed above, e.g. character spacing and alignment, are used to determine the maximum size width data in a cell as well as the maximum sized height in a cell. The total width-and-height can refer to characters (letters, numbers), as well as images in a cell. The instant method and computer-executable program code is capable of defining maximum width and/or height parameters for each column in the first sub-table and the second sub-table based on a total value of characters and/or images in a maximum width or height cell within said each column, thereby creating a maximum height-or-width parameter cell. That is, the text width via glyphs and font metrics mentioned above and plus any other HTML images which are just a straight pixel addition.

When compared to the method of Benhase et al. (App. Publication No. 2005/0120293), which teaches sub heading cells to determine the width of the Main Heading Cell, the instant method uses the data cells within the same column that has a direct relationship to the header cell. Benhase et al's "Sub Heading Cells" is really a row of data, actually a single row of sub heading data, whereas the instant invention applies to the entire data table area that contains more than one row of data. According to the published application, the columns are hidden, that is, entire columns, including the sub heading column are hidden. In contrast, in the instant invention a copy of the widest cell is hidden and not the entire original data cell, original data or original column. Benhase does not make or use a true second copy of data; it only "hides original data" whereas the instant invention "hides a copy of the data."

According to the instant method, the widest data cell (maximum parameter cell) is copied, and the copy is hidden in the same column header area. This copying is also done for the header cell into the data table as well in case the header cell is wider than all of the data cells. The cell that the data is copied into becomes a new hidden cell that resides directly above or below the header cell, in the same column. While the hidden data in the new hidden cell is not displayed, the method of the instant invention uses this hidden data to set the width in the browser.

Figure 27:
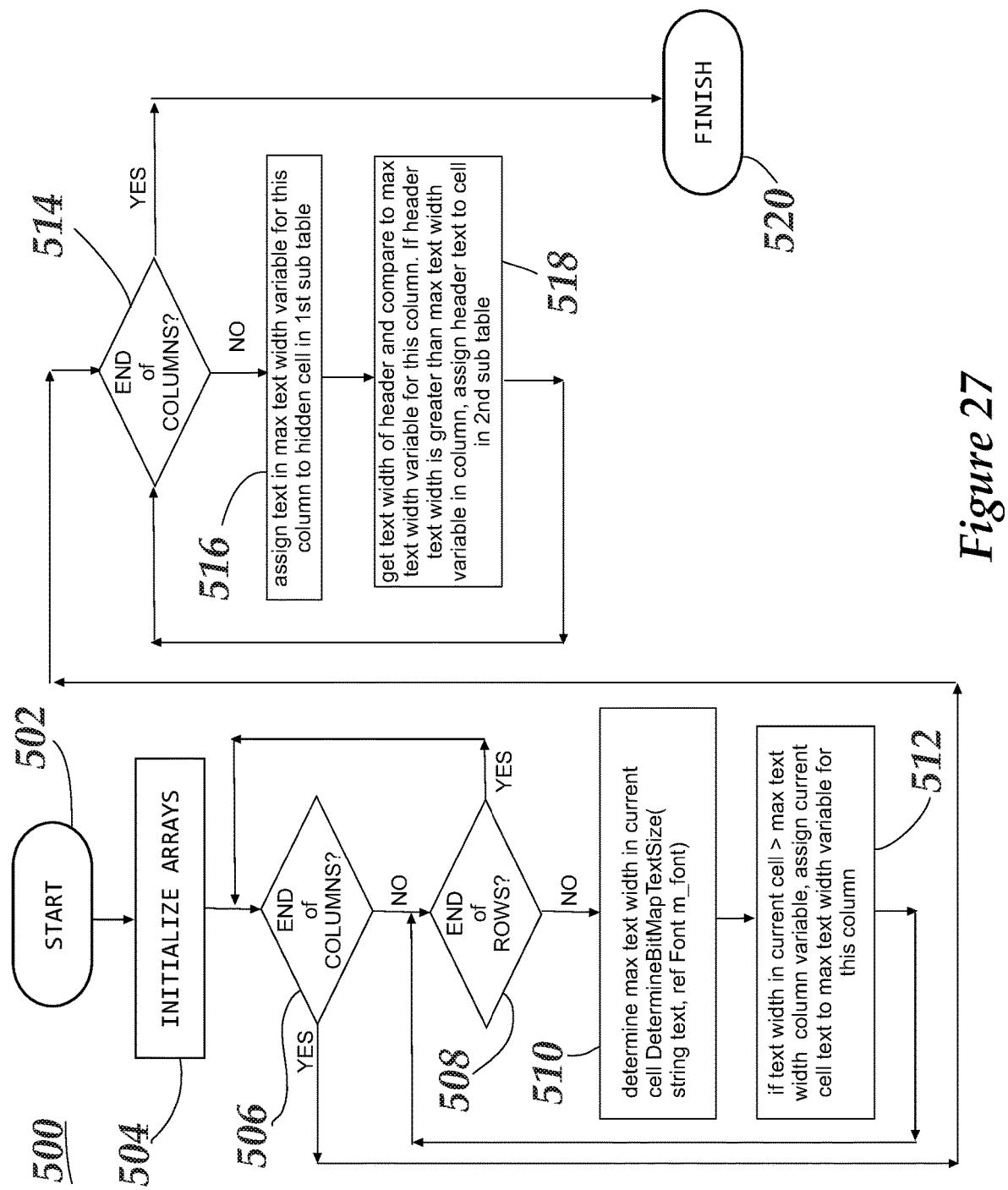
FIG. 27 illustrates a flow diagram for adjusting of cell widths in a table with rows and columns.

The flow charts of FIGS. 27-30 are exemplary schematics on the method of determining the cell width according to the method of the instant invention. FIG. 27 illustrates a flow diagram 500 for the adjusting the cell widths in a table 92 with rows and columns. An initialization block (step) 504 is used to store each column's max cell width value and determination for a Header Table 40 and a Data Table 42 of which are the combined table 92. At steps 506 and 508, the method checks to see if all the cells in the corresponding columns and rows have been analyzed. If the answer to a question whether the cursor is at the end of columns is "Yes," the method proceeds to a second control step 514. If the answer is "No," the method also inquires whether the cursor is at the end of rows. A "Yes" answer requires the user to return to the first control step 506 to re-confirm that the cursor is at the end of the columns. A "No" answer causes the computer-executable program to proceed to step 510 and determine the max text width value in the corresponding cell using the cell text, other cell contents, and the cell text font as its parameters.

A comparison step 512 compares the text width values in the current cell with the maximum text width variable for that column. If the text width in the current cell is greater than the value stored in a variable for that column, the variable's value is then assigned the text width of the current cell. Following completion of the comparison step 512, the program returns to the question 508—whether the end of rows has been designated.

The second control step 514, along with steps 516 and 518, will then check to see if the hidden rows 48 in the corresponding Header Table and hidden row 66 in its corresponding data table 42 have had their corresponding cell contents updated with copies of cell contents as stored in the column variables that were initialized in the step 504 and which in turn were determined from Header table 40 or the Data table 42, respectively. If the answer to the question in 514 ("End of columns?") is yes, the program finishes the cell width determination. If the answer to the question in step 514 is "No," the program then causes performance of the step 516 by assigning text in max text width variable for a particular column to a hidden cell in the first sub table.

The next step in the method, step 518, allows the user to get the text width of the Header and compare it to the max text width variable for the particular column as determined in the step 516. The program then double checks the assignment of the text in max text width variable and returns to answer the question "end of columns?" a positive answer will finalize the process.

Figure 28:
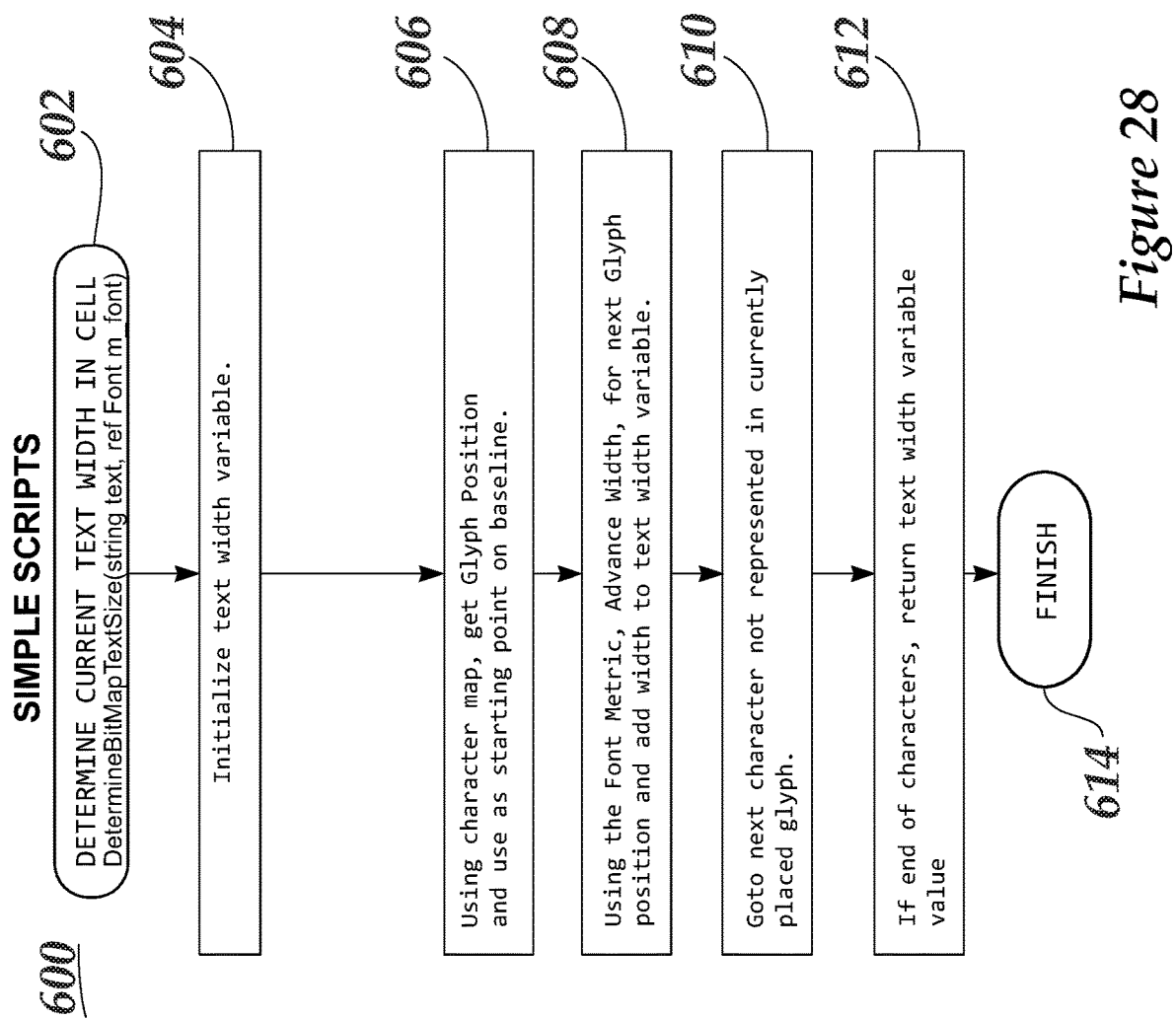
FIG. 28 illustrates a flow diagram for determining text width in a cell using simple scripts for horizontal metrics.

FIG. 28 illustrates a flow diagram 600 for the determination of current text width in a cell using simple scripts for horizontal metrics. The step of determining the text width 602 has parameters, text contents and font metrics. A step 604 initializes variables used to determine the text width. The next step 606 uses a character map of the selected font to obtain the glyph position value and then uses this position value as a starting point on the baseline. A step 608 uses the Font Metric and Advance Width to determine the next glyph position value and combines this width to text width variable that was initialized in step 604. A step 610 causes the flow diagram 600 to go the next character not represented in currently placed glyph. A step 612 checks to see if flow diagram 600 is at the end of characters submitted in step 602 and if so, returns text width variable value.

Figure 29:
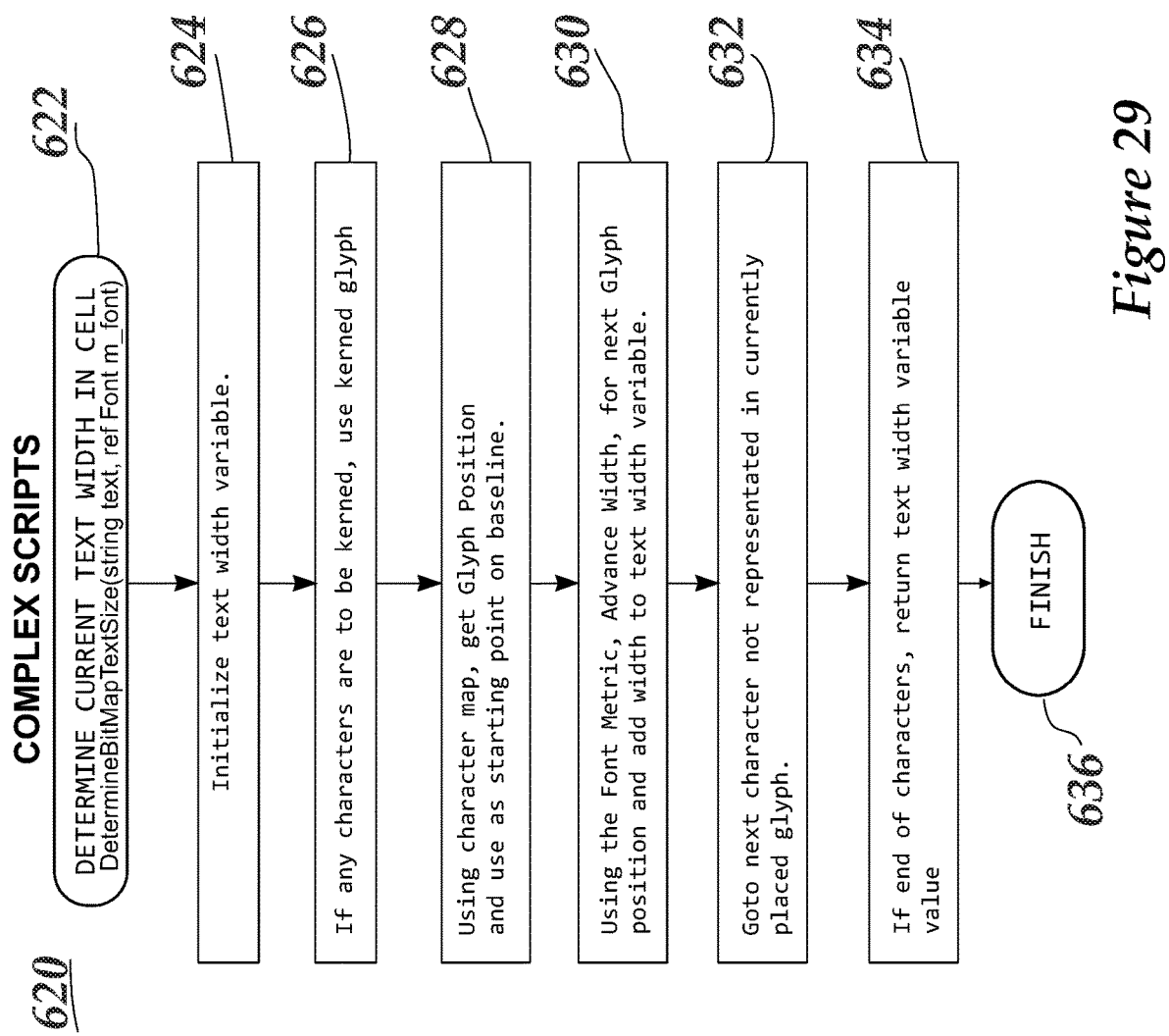
FIG. 29 illustrates a flow diagram for determining text width in a cell using complex scripts of horizontal metrics.

FIG. 29 illustrates a flow diagram 620 for determining current text width in a cell using complex scripts of horizontal metrics. The method 622 has parameters, text contents and font metrics. A step 624 initializes variables used to determine the text width. A step 626 checks to see if any character is to be kerned. If so, then the keened glyphs are used. A step 628 uses the character map of the selected font to get the glyph position and uses this position as a starting point on the baseline. A step 630 uses the Font Metric and Advance Width to determine the next glyph position and add this width to text width variable that was initialized in the step 624. A step 632 causes the flow diagram 620 to go the next character not represented in currently placed glyph. A step 634 checks to see if the flow diagram 620 is at the end of characters submitted in the step 622 and if so, returns text width variable value.

Figure 30:
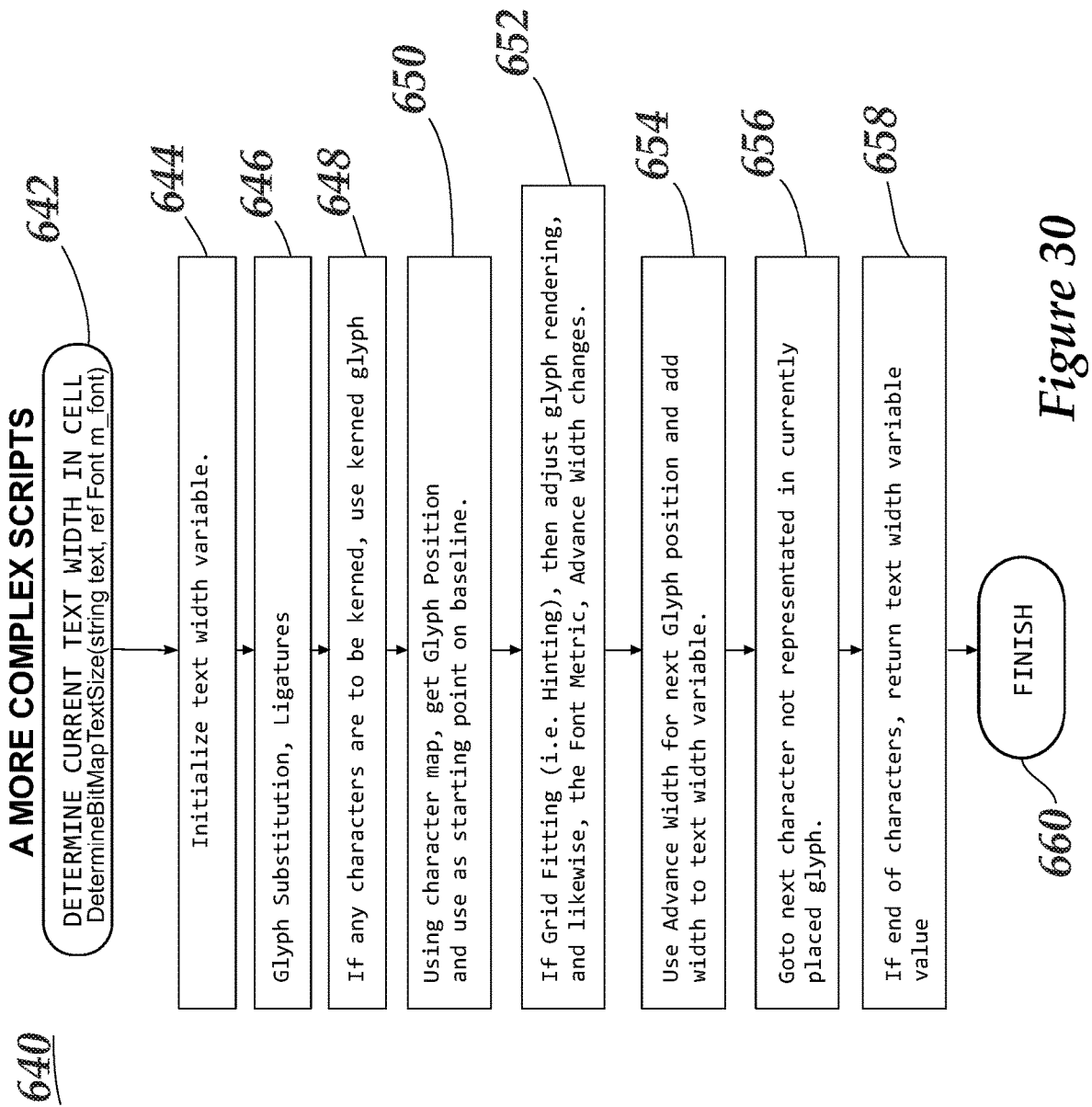
FIG. 30 illustrates a flow diagram for determining text width in a cell using more complex scripts of horizontal metrics.

FIG. 30 illustrates a flow diagram 640 for determining text width in a cell using more complex scripts of horizontal metrics. The calling method 642 has parameters, text contents and font metrics. A step 644 initializes variables used to determine the text width. A step 646 checks for any glyph substitutions, like ligatures, and makes substitutions if so marked. A step 648 checks to see if any character is to be kerned. If so, then the kerned glyphs are used.

A step 650 uses the character map of the selected font and gets the glyph position, then uses this position as a starting point on the baseline. A step 652 checks for grid fitting (i.e. hinting) then adjust glyph for rendering and likewise, the font metrics and any advance width changes. A step 654 uses the Font Metric and Advance Width to determine the next glyph position and add this width to text width variable that was initialized in the step 644. A step 656 causes the flow diagram 640 to go the next character not represented in currently placed glyph. A step 658 checks to see if flow diagram 640 is at the end of characters submitted in the step 642 and if so returns text width variable value.

Figure 31:
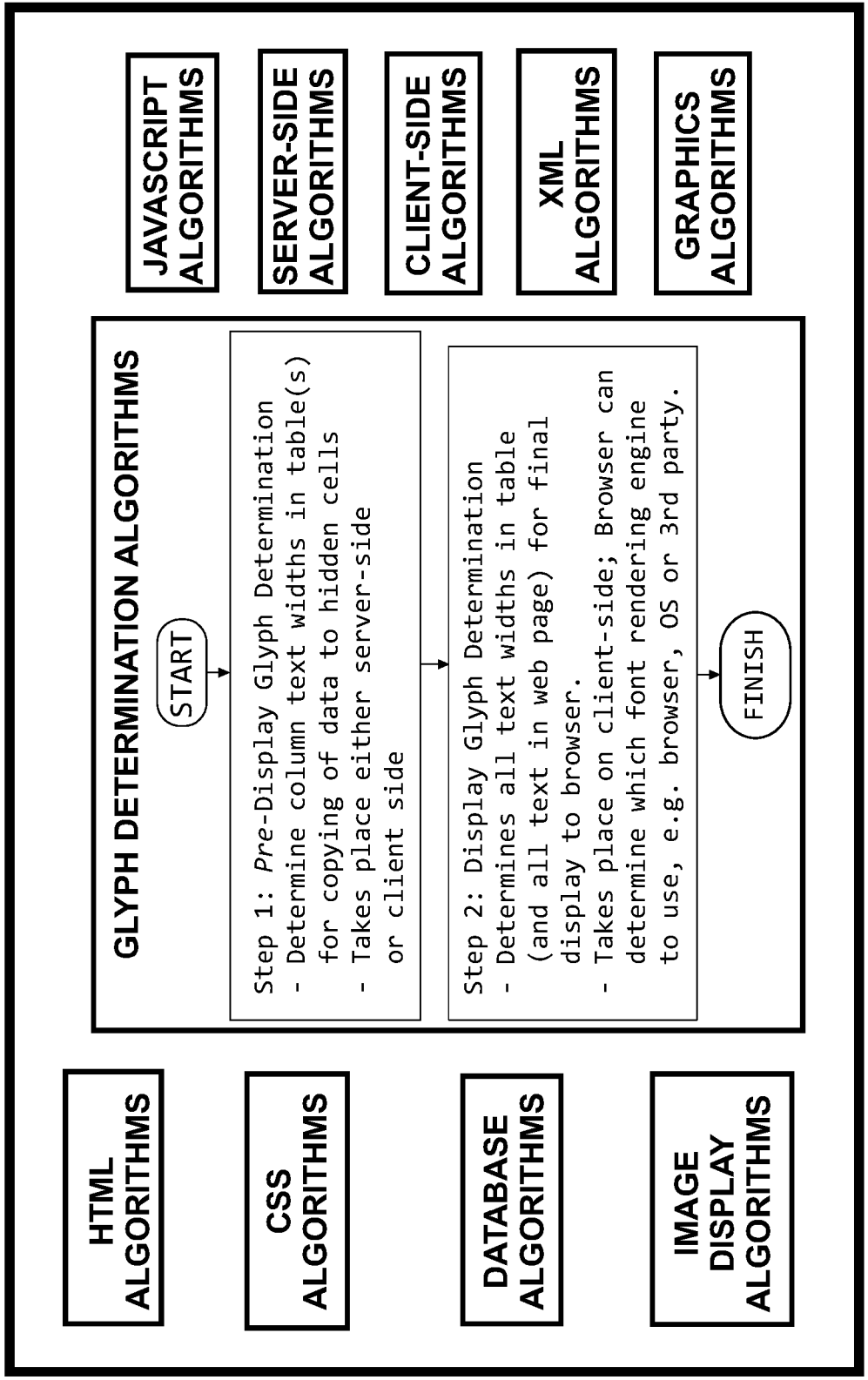
FIG. 31 illustrates the two step process of glyph value determination.

FIG. 31 illustrates the two-step process of glyph value determination. In Step 1, the system determines glyph value before displaying it in the data table: determines column text widths in the tables for copying of data to hidden cells. This step can be performed at either server side or the client side. Step 2 displays the resulting glyph value in a multi-task process: (a) takes the HTML data as is, with no more changes from user (e.g. there is no copying of data into hidden cells, which is performed in Step 1; (b) makes glyph determinations for display, and then (c) actually displays the pixels (turns them on/off and/or chooses the pixel color) to render the fonts on the monitor. At step 2, the system determines all text widths in table (an all text on a web page) for final display to a browser.

Step 1 is not the most direct, or immediate step, to render fonts as pixels onto the browser window as in Step 2. Step 1 can use the font rendering engine in Step 2, or Step 1 can use the font rendering engine on the server-side to make glyph value determinations.

Step 2 Display Glyph determinations are part of the final font rendering process that is the final HTML data from the user, with no more changes submitted from the user. The "final call" allows the system to perform all glyph determinations from this final HTML data and proceed to finish the table display task, e.g. turn certain pixels on or off, and with a particular color so as to draw these glyph(s) on the user's browser window. These glyph calculations can occur in the midst of the many other algorithms that also happen when displaying a web page.

Both Step 1 and Step 2 use a Font Rendering Engine to make glyph determinations, although Step 1 uses this Font Rendering Engine in a different manner than in Step 2: Step 1 instructs the Font Rendering Engine to determine the widths of this text, but not actually display it before copying of HTML data with that glyph width(s) determined by the Font Rendering Engine. The Font Rendering Engine or Glyph Determinations in Step 1 can be done on the server-side or the client-side. The Font Rendering Engine or Glyph determinations of Step 2 is done on the user side, e.g. the user's browser. In effect, Step 2 makes Glyph Determinations with no more changes to the HTML data where aforementioned changes have a goal of adjusting the column widths in a table via copying of data into hidden cells. Step 2 does not have the Step 1 goal to use glyph determinations to modify the HTML data via copying of data into hidden cells to adjust the column table width(s).

FIG. 31 illustrates a flow chart with only the Glyph Determination algorithm being described in more detail. HTML, CSS. DATABASE, IMAGE DISPLAY, JAVASCRIPT, SERVER-SIDE, CLIENT-SIDE. XML, and GRAPHICS algorithms represent the computer code used to execute the said name of the algorithm. The algorithms in FIG. 31 schematically represent an overview or a brief summary of what the computer code is supposed to do. The Glyph Determination Algorithms is a summary of what the computer code is supposed to do. Step 1 and Step 2 in said Glyph Determination Algorithms box goes into more detail into what the Glyph Determination Algorithm does. The other algorithms, like HTML Algorithm, CSS Algorithm and JavaScript Algorithm are also a 1-word descriptions of the computer code that is executed in conjunction with the Glyph Determination Algorithms. The other algorithms are shown in boxes and surround the Glyph Determination Algorithm to indicate there is mixing around of all the different algorithms where each Algorithm's computer code is partially run at many different times and inter-dispersed among the other different algorithms.

The instant method allows a number of advantages, among those:

1. Avoid the use of PLUG-INs or asking the user to download programs as many users are wary of downloading unknown programs (e.g. viruses, spyware) onto their computer.

2. Minimal data and/or code download per web page for better system response and/or performance on the web server and the user's computer.

3. Minimal web server CPU load to produce the fixed header code so as to serve more users and/or to serve users faster.

In effect, the instant invention allows for two independent pieces of data to reside in the same column—one visible and one hidden. This process is different from re-ordering or re-positioning the data, which means that the same piece of data is moved from one cell to another. When a user re-orders data, the user still has the same set of original data members in the new re-ordered set of data except that the data members are in a different order. In other words, after the user completes the re-ordering of data, the new re-ordered set of data will not contain any new or additional data members when compared to the original set of data members.

Additionally, the instant method provides for forming a second scrollable sub-table for displaying records corresponding to the headings in the first sub-table. This step is different from using a sub header that is a single sub header row, which does not require scrolling or a scrollbar.

Many changes and modifications call be made in the method of the present invention without departing from the spirit thereof. I, therefore, pray that my rights to the present invention be limited only by the scope of the appended claims.

I claim:

1. A method of displaying on a user-interactive computer-controlled screen, records arranged in a table, said table having columns, rows and a plurality of cells defined by the columns and rows, the method comprising the steps of:

forming a first non-scrollable sub-table within said table for displaying headings of the columns;

forming a second scrollable sub-table within said table for displaying records corresponding to the headings in the first sub-table;

defining a character map and obtaining a glyph position value of each character and image in the cell;

combining the glyph position values for all characters and images in the cell;

determining one of a width and height value of character spacing;

defining maximum width and height parameters for each column in the first sub-table and the second sub-table based on a total combined glyph position value of characters and images in a maximum width or height parameter cell within said each column depending on character spacing and alignment within a cell, which creates and defines a maximum height-and-width parameter cell;

defining a visible part of the first sub-table to be visible on the computer-controlled screen and a hidden part of the first sub-table that is non-visible on the computer-controlled screen;

determining a pre-display glyph value by determining column text width in a table for copying of data, consisting of the characters and images in the cell, to non-visible cells and displaying resultant glyph value for final display to a browser engine;

copying, using computer-executable program, character and image data, without re-positioning, of the maximum height-and-width parameter cell into a hidden cell within the same column in the hidden part of the first sub-table;

maintaining hidden data and visible data simultaneously in a web-displayed table stored in a HyperText Markup Language (HTML) format;

executing a plurality of formatting instructions affecting a visual characteristic of text and images, the formatting instructions comprising the web-displayed table with layout formatted in accordance with the HTML format and a cascading style sheet (CSS) instruction to hide rows that have data inside the table cells; and displaying on the computer-controlled screen, records arranged in the web-displayed table having a non-scrollable header part and a scrollable part in each data cell;

wherein said step of displaying comprises steps of accepting the determined column text width, determining the resultant glyph value, the characters and images of the table, for displaying on the computer-controlled screen, and displaying pixels to render fonts on the computer-controlled screen using client-side determined resultant glyph value from the web-displayed table to further modify the data by copying of data into hidden cells to adjust the column table width.

2. The method of claim 1, wherein the parameter data to be copied into the hidden first sub-table are assigned a pre-determined height adjusted to a pre-determined height-or-width parameter value prior to copying the parameter data into the hidden part of the first sub-table.

3. The method of claim 2, wherein the height-or-width parameter value has the height value of 1 px or less.

4. The method of claim 1, wherein a cell width is assigned by setting a <td> width character parameter to a pixel value of a record within the cell.

5. The method of claim 1, wherein a cell is assigned a discrete width by determining a percentage value of the corresponding column in relation to a remainder first sub-table width.

6. The method of claim 1, wherein the non-scrollable first sub-table defines a fixed header of the table.

7. The method of claim 1, wherein the first sub-table defines a fixed sidebar of the table.

8. The method of claim 1, wherein data of the maximum width or height cell from the visible part of the first sub-table is copied to the hidden part of the second sub-table.

9. The method of claim 1, further comprising a step of initializing a text width variable for each cell of the table.

10. A computer program, embodied on a non-transitory computer readable storage medium, the computer program configured to control a processor to perform operations, comprising:
defining a set combined total value of height-or-width characters and images based on character spacing, images and alignment within a cell for a record of the database arranged in a web-displayed table with layout formatted in accordance with a HyperText Markup Language (HTML) format, the cell having columns, rows and a plurality of cells defined by the columns and rows record table having columns, rows and a plurality of cells defined by the columns and rows, determining maximum height-or-width character and image parameters for each column or row in the record table based on records to be displayed in a cell that will have the maximum height-or-width parameters;
executing a plurality of formatting instructions affecting a visual characteristic of text and images, the formatting instructions comprising a cascading style sheet (CSS) instruction to hide rows that have data inside the table cells;
defining a character map and obtaining a glyph position value of each character in the cell;
combining the glyph position values for all characters in the cell;
determining one of a width and height value of character spacing;
establishing a first sub-table defining a non-scrollable part of each column;
establishing a second sub-table defining scrollable part of each column;
establishing a visible part of the first sub-table and a hidden part of the first sub-table;
determining a pre-display glyph value by determining column text width in a table for copying of data, consisting of the characters and images in the cell, to non-visible cells and displaying resultant glyph value for final display to a browser engine, said step of displaying the resultant glyph value comprises steps of accepting the determined column text width, determining the resultant glyph value, the characters and images of the table, for displaying on the computer-controlled screen, and displaying pixels to render fonts on the computer-controlled screen using client-side determined resultant glyph value from the web-displayed table to further modify the data by copying of data into hidden cells to adjust the column table width;
copying, without re-positioning, records from a visible cell having maximum height-and-width character and image record into a hidden cell within the same column in the hidden part of the first sub-table;
defining a set of parameters for displaying records arranged in the table having a stationary part and a scrollable part in each column;
maintaining hidden data and visible data simultaneously in the web-displayed table stored in the HTML format.

11. The computer program of claim 10, wherein the records to be copied into the hidden first sub-table are assigned a pre-determined height adjusted to a pre-determined parameter value prior to copying the records into the hidden part of the first sub-table.

12. The computer program of claim 10, wherein the parameter value has the height value of 1 px or less.

13. The computer program of claim 10, wherein a cell width is determined by setting a <td> width parameter to a pixel value of the record within the cell.

14. The computer program of claim 10, wherein a cell width is assigned a discreet width determined by determining a percentage value of the corresponding column in relation to a remainder record table width.

15. The computer program of claim 10, wherein the non-scrollable first sub-table defines a fixed header of the table.

16. The computer program of claim 10, wherein the non-scrollable first sub-table defines a fixed sidebar of the table.

17. The computer program of claim 10, wherein the records to be copied into the hidden first sub-table are copied into the hidden part of the first sub-table.

18. The computer program of claim 10, comprising a computer-executable program code initializing a text width variable for each cell of the table.

19. The computer program of claim 10, wherein the data of the cell with maximum height-or-width parameters copied into a cell within a corresponding column in the hidden part of the first sub-table is representative data of the cell with maximum height-or-width parameters.

20. A method for creating stationary header rows in a web page displayed on a user-interactive processor screen, for a table of data having a plurality of cells each having vertical columns and horizontal rows that are scrollable, the method comprising:
generating at least one placeholder in an originating cell of the table;
copying into stationary header rows said at least one placeholder from the table;
defining a character map and obtaining a glyph position value of each character in the cell;
determining a pre-display glyph value by determining column text width in a web-displayed table for copying of data, consisting of the characters and images in the cell, to non-visible cells;
displaying resultant glyph value for final display to a browser engine;
combining the glyph position values for all characters in the cell and determining width-or-height value of character spacing, and determining widest width of a corresponding originating table cell and column;
introducing said at least one placeholder in a table column to cause the column to automatically size to the same widest width as a corresponding originating table cell and column;
determining character spacing, images and alignment within each table cell in the web-displayed page for table with layout formatted in accordance with a HyperText Markup Language (HTML) format, the cell having columns, rows and a plurality of cells defined by the columns and rows record table having columns, rows and a plurality of cells defined by the columns and rows;
determining the maximum text width for each table cell based on the determined character spacing, images and alignment within each table cell in the web-displayed page for the web-displayed table with layout formatted in accordance with the HTML format;

executing a plurality of formatting instructions affecting a visual characteristic of text and images, the formatting instructions comprising a cascading style sheet (CSS) instruction to hide rows that have data inside the table cells;

creating a stationary part, a scrollable part, a hidden part and a visible part in each column, and wherein each column has a stationary header row;

wherein said step of displaying comprises steps of accepting the determined column text width, determining the resultant glyph value, the characters and images of the table, for displaying on the computer-controlled screen, and displaying pixels to render fonts on the computer-controlled screen using client-side determined resultant glyph value from the web-displayed table to further modify the data by copying of data into hidden cells to adjust the column table width.

21. The method of claim 20, wherein said at least one placeholder is generated in the stationary header row and copied into the table of data so as to balance and equalize widths of cells for each column in the stationary part and the scrollable part and create alignment between the stationary part and the scrollable part.

22. A non-transitory computer-readable storage medium comprising computer-readable code stored thereon that, when executed, is configured to cause a data processing apparatus to: determine a set of combined total value of height-or-width characters of text and images based on character spacing, images and alignment within a cell for a record of the database arranged in a web-displayed table with layout formatted in accordance with a HyperText Markup Language (HTML) format, the cell having columns, rows and a plurality of cells defined by the columns and rows;

execute a plurality of formatting instructions affecting a visual characteristic of text or images, the formatting instructions comprising a cascading style sheet (CSS) instruction to hide rows that have data inside the table cells;

determine maximum height-or-width character and image parameters for each column or row in the web-displayed table;

define a character map and obtain a pre-display glyph position value of each character in the cell;

combine glyph position values for all characters in the cell;

determine width-or-height value of character spacing;

form a first sub-table defining a non-scrollable part of each column;

form a second sub-table defining scrollable part of each column;

establish a visible part of the first sub-table and a hidden part of the first sub-table to reside simultaneously in the first sub-table;

determine a pre-display glyph value by determining column text width in a table for copying of data, consisting of the characters and images in the cell, to non-visible cells and display resultant glyph value for final display to a browser engine;

copy, without re-positioning, records from a visible cell having maximum height-and-width character and image record into a hidden cell within the same column in the hidden part of the first sub-table;

defining a set of parameters for displaying records arranged in the table having a stationary part and a scrollable part in each column;

maintaining hidden data and visible data simultaneously in the web-displayed table stored in the HTML format;

wherein displaying comprises a program code that, when executed, is configured to display the resultant glyph value, accepting the determined column text width, determining the resultant glyph value, the characters and images of the table, for displaying on the computer-controlled screen, and displaying pixels to render fonts on the computer-controlled screen using client-side determined resultant glyph value from the web-displayed table to further modify the data by copying of data into hidden cells to adjust the column table width.

23. The non-transitory computer-readable storage medium comprising computer-readable code stored thereon of claim 22, comprising a program code that, when executed, is configured to use CSS properties and values "visibility: hidden" and "display: none" to allow hiding of the copied data or header.

24. The non-transitory computer-readable storage medium comprising computer-readable code stored thereon of claim 22, comprising a program code executable with a browser engine configured to use CSS property "line-height."

* * * * *